United States Patent
Nishimura

(10) Patent No.: US 6,856,470 B2
(45) Date of Patent: Feb. 15, 2005

(54) ROD LENS AND LASER MARKING APPARATUS

(75) Inventor: Takashi Nishimura, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 10/646,689

(22) Filed: Aug. 25, 2003

(65) Prior Publication Data

US 2004/0051974 A1 Mar. 18, 2004

(30) Foreign Application Priority Data

Aug. 26, 2002 (JP) ........................................ 2002-245049
Sep. 3, 2002 (JP) ........................................ 2002-257980
Sep. 3, 2002 (JP) ........................................ 2002-258012

(51) Int. Cl.[7] ........................ G02B 13/18; G02B 17/00; G02B 27/14
(52) U.S. Cl. ........................ 359/710; 359/726; 359/629; 33/227
(58) Field of Search ................................ 359/710, 618, 359/629, 718, 719, 736, 738, 615; 33/290, 227, 281, 282, 285, DIG. 21

(56) References Cited

U.S. PATENT DOCUMENTS 5,872,657 A * 2/1999 Rando ........................ 359/629
6,679,609 B2 * 1/2004 Ohtomo et al. ............. 359/615

* cited by examiner

*Primary Examiner*—Georgia Epps
*Assistant Examiner*—Jack Dinh
(74) *Attorney, Agent, or Firm*—McGuireWoods LLP

(57) ABSTRACT

A laser beam incident on a rod lens has a greater cross-sectional diameter than that of a rod lens main body, and mirrors are provided near the rod lens main body to reflect incident light toward the same. Since light of a strong beam intensity reflected onto the rod lens main body by the mirrors produces a greater angle than light of weak beam intensity, this configuration has an effect of increasing the light intensity on the ends of a resulting line beam and, thus, expands the spreading angle of visible light in the line beam.

59 Claims, 18 Drawing Sheets

PRIOR ART

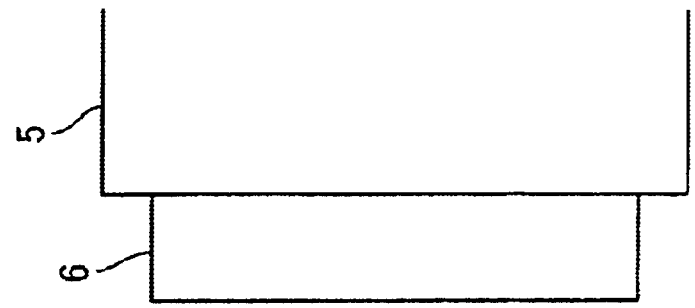
FIG.11
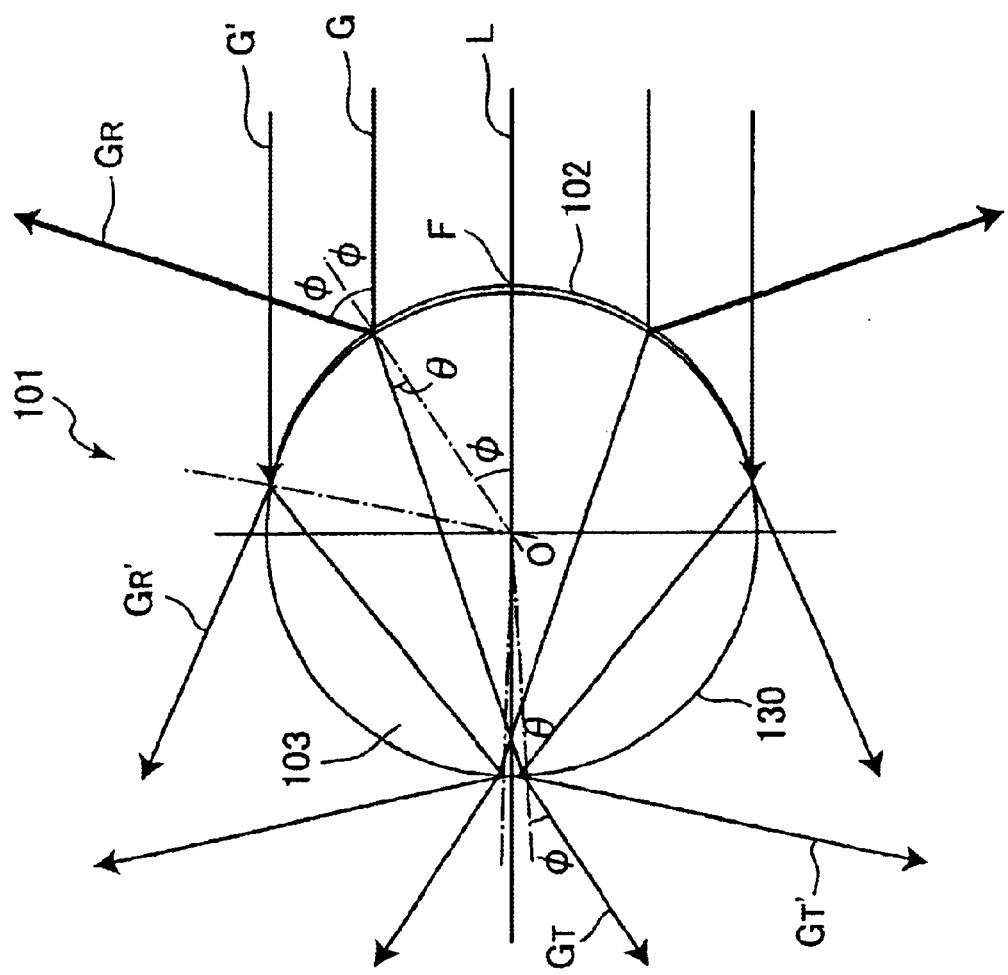

| α | APPROXIMATELY 0° | 10° | 20° | 23° | 26° | 28° | 30° |
|---|---|---|---|---|---|---|---|
| N | 3.0 | 2.96 | 2.88 | 2.84 | 2.80 | 2.77 | 2.73 |

ROD LENS AND LASER MARKING APPARATUS

BACKGROUND OF THE INVENTION

1. Field of the Invention

The present invention relates to a rod lens, a line-beam generating optical system equipped with the rod lens for generating a line beam, and a laser marking apparatus equipped with the line-beam generating optical system.

2. Description of Related Art

In house building and particularly in the beginning phase of construction, marking operations are essential for producing level lines needed to set reliable baselines for positioning various building members when machining the members and for installing the building members. Level instruments and other tools are used at the building site to achieve level measurements. A plurality of marks are made on the walls of target structure, and marking lines are formed by connecting these marks to produce the baselines for construction.

These marking lines include various lines, such as vertical lines drawn from the floor over the wall and to the ceiling, perpendicular (right angle) lines drawn on the ceiling and made by two vertical lines, and horizontal lines drawn on the walls; ground marks (dots) formed on the floor; and the like.

Marking operations performed manually require at least two workers. Conventionally, marking operations have required much time and effort and have been inefficient. However, in order to overcome this problem, recently more efficient marking operations have been performed using a laser marking apparatus having a line beam irradiation function. Since one worker can easily perform marking operations using a laser marking apparatus, this apparatus is becoming an essential tool in construction work.

In order to improve the efficiency of marking operations using a laser marking apparatus, it is desirable to be able to irradiate a plurality of marking lines with a single laser marking apparatus. Hence, devices capable of irradiating two or more lines with a single apparatus are now being proposed.

Systems known in the art for irradiating a plurality of lines from a single laser marking apparatus include a system using a plurality of laser light sources and a system that obtains a plurality of lines by dividing a laser beam emitted from a single laser light source.

The former system is problematic in that the cost of the apparatus increases as more laser light sources are added.

On the other hand, the latter system uses a light-emitting optical system constructed of a plurality of half mirrors arranged serially in the laser emitting direction. An example of such a system is disclosed in Japanese patent application publication No. HEI-9-159451. In this system, however, the intensity of the light is cut in half after passing through the first half mirror and is reduced by half again when passing through the second half mirror. Since the intensity of the light is gradually reduced when passing through each of the half mirrors in this way, the light intensity of the resulting divided beams is different from each other. Hence, a different brightness is obtained for each of the plurality of line beams. Further, a plurality of half mirrors must be arranged to divide the beam, thereby increasing the complexity of the optical system and, moreover, increasing the number of optical elements.

Accordingly, most conventional laser marking apparatuses capable of irradiating a plurality of line beams are equipped with a laser light source for each line beam generated. However, as described above, the cost of the apparatus rises as the number of light sources increases. As a result, an expensive apparatus is required to perform efficient marking operations.

SUMMARY OF THE INVENTION

When the line beam obtained by a single laser light source covers an angle of 180° or less, two laser light sources are required to form vertical lines or horizontal lines on both of the front side and back side of the laser marking apparatus. Requiring two laser light sources increases costs, making it difficult to perform efficient, low cost operations.

When a line beam is produced by irradiating light onto a rod lens, the wide angle covered by the line beam is greatly dependent on the ratio of incidence to a rod lens, that is, the ratio of the diameter of incident light to the diameter of the rod lens.

FIG. 1 shows a cross-section of a conventional cylindrical rod lens 300. An axis O of the rod lens 300 extends perpendicular to the surface of the paper. Now consider two cases in which a light source to the right of the rod lens 300, though not shown in the drawing, emits two laser beams F and G having different diameters that are incident on the rod lens 300. The optical axes L of the laser beam F and laser beam G intersect the axis O of the rod lens 300 perpendicularly. The diameter of the laser beam F is larger than that of the laser beam G. After being refracted by the rod lens 300 according to Snell's law, both the laser beam G and the laser beam F spread outward forming line beams, respectively. For the sake of clarity, FIG. 1 shows only the portions of the laser beam G and the laser beam F traveling farthest from the optical axis L and above the optical axis L and how this light spreads below the optical axis L. In fact, the laser beam G and laser beam F spread in vertical symmetry about the optical axis L. Hence, the spreading angle of the laser beam G is represented as twice the size of an angle $\theta g$ formed between the optical axis L and the portion of the emitted light in the laser beam G traveling along the outermost optical path. Similarly, the spreading angle of the laser beam F is represented as twice the size of an angle $\theta f$ formed between the optical axis L and the portion of emitted light in the laser beam F traveling along the outermost optical path. As shown in FIG. 1, the angle $2\theta f$ is larger than the angle $2\theta g$.

However, the diameter of the laser beam F is larger than that of the laser beam G and, hence, the incidence ratio of the laser beam F on the rod lens 300 is also larger than that of the laser beam G. It is therefore known that the larger the incidence ratio on the rod lens 300, the greater the spreading angle of the produced beam.

Therefore, in order to produce a sufficiently wide angle of a line beam, the light must be irradiated on the rod lens such that the ratio of the diameter of the incident beam to the diameter of the rod lens is 100%. However, if the diameter of the incident beam is set to a ratio with the rod lens diameter that exceeds 100%, a sufficiently wide line beam can be easily produced, but the following problems occur.

The intensity of laser and other light beams normally follows a Gaussian distribution in which the intensity drops rapidly from the center of the beam toward the periphery. Accordingly, when an incident beam having a beam diameter to rod lens diameter of 100% is converted to a line beam by the rod lens, the center portion of the generated line beam can be seen clearly, but the ends of the beam have low intensity and can hardly be seen. Therefore while a sufficiently wide angle is produced in principle, the effective angle of visible light is only about 140°.

Further, if the diameter of the incident beam is larger than that of the rod lens, portions of the incident light outside of the rod lens do not pass through the lens and, thus, proceed straight forward and are irradiated as dot shaped bright spots on the line beam. These dot beams can be removed by providing light shielding parts near the rod lens, but the efficiency for converting incident light to line beams is poor because light not incident on the rod lens is not being used.

In view of the foregoing, it is an object of the present invention to provide a rod lens, a line-beam generating optical system, and a laser marking apparatus capable of efficiently producing a line beam having a wide angle.

In order to attain the above and other objects, the present invention provides a rod lens comprising: a reflecting portion generating a reflected light by reflecting at least a portion of an incident light; and a rod lens main body of substantially a cylindrical shape generating a transmitted light by transmitting at least a remaining portion of the incident light, the rod lens main body having an axis and a circumferential side surface extending along the axis, the circumferential side surface being substantially cylindrical in shape and encircling the axis in a circumferential direction, the reflecting portion and the rod lens main body cooperating to generate a line beam made from both of the reflected light and the transmitted light.

According to another aspect, the present invention provides a line-beam generating optical system, comprising: a light source emitting a light beam along an optical axis; a collimating lens converting the light beam emitted from the light source into a collimated light; and a rod lens including: a reflecting portion generating a reflected light by reflecting at least a portion of the collimated light that falls incident on the rod lens along the optical axis; and a rod lens main body of substantially a cylindrical shape generating a transmitted light by transmitting at least a remaining portion of the incident collimated light, the rod lens main body having an axis that extends substantially perpendicularly to the optical axis and a circumferential side surface extending along the axis, the circumferential side surface being substantially cylindrical in shape and encircling the axis in a circumferential direction, the reflecting portion and the rod lens main body cooperating to generate a line beam made from both of the reflected light and the transmitted light.

According to another aspect, the present invention provides a line-beam generating optical system, comprising: a light source emitting a light beam; a collimating lens converting the light beam emitted from the light source into a collimated light; a first half mirror separating the collimated light into a first reflected collimated light and a first transmitted collimated light; a first rod lens disposed on an optical path of the first reflected collimated light; a second half mirror disposed on an optical path of the first transmitted collimated light and separating the first transmitted collimated light into a second reflected collimated light and a second transmitted collimated light; a second rod lens disposed on an optical path of the second reflected collimated light; and a third rod lens disposed on an optical path of the second transmitted collimated light, wherein each of the first rod lens, second rod lens, and third rod lens includes a rod lens main body substantially cylindrical in shape with a circumferential side surface extending along a corresponding axis and generating a transmitted light by transmitting at least a portion of the corresponding collimated light, and wherein a light separating portion is formed on a portion of the circumferential side surface of at least one of the first, second, and third rod lenses, the light separating portion separating the corresponding collimated light into a transmitted light and a reflected light, thereby generating a line beam made from the transmitted light and the reflected light.

According to another aspect, the present invention provides a line-beam generating optical system, comprising: a light source emitting a light beam; a collimating lens converting the light beam emitted from the light source into a collimated light; a first half mirror separating the collimated light into a first reflected collimated light and a first transmitted collimated light; a first rod lens disposed on an optical path of the first reflected collimated light; a second half mirror disposed on an optical path of the first transmitted collimated light and separating the first transmitted collimated light into a second reflected collimated light and a second transmitted collimated light; a second rod lens disposed on an optical path of the second reflected collimated light; and a third rod lens disposed on an optical path of the second transmitted collimated light, wherein each of the first rod lens, second rod lens, and third rod lens includes a rod lens main body substantially cylindrical in shape with a circumferential side surface extending along a corresponding axis and generating a transmitted light by transmitting at least a portion of the corresponding collimated light, and wherein a light reflecting region is formed over a part of the circumferential side surface of at least one of the first, second, and third rod lenses along the circumferential direction and receives and reflects a portion of the incident collimated light, the corresponding rod lens main body including a transmitting region which receives and transmits the remaining portion of the incident light.

According to another aspect, the present invention provides a laser marking apparatus comprising: a laser emitting a light beam along an optical axis; a collimating lens converting the light beam emitted from the laser into a collimated light; a rod lens including a reflecting portion generating a reflected light by reflecting at least a portion of the collimated light that falls incident on the rod lens along the optical axis; and a rod lens main body of substantially a cylindrical shape generating a transmitted light by transmitting at least a remaining portion of the incident collimated light, the rod lens main body having an axis that extends substantially perpendicularly to the optical axis and a circumferential side surface extending along the axis, the circumferential side surface being substantially cylindrical in shape and encircling the axis in a circumferential direction, the reflecting portion and the rod lens main body cooperating to generate a line beam made from both of the reflected light and the transmitted light; and a support portion supporting the laser, the collimating lens, and the rod lens.

According to another aspect, the present invention provides a laser marking apparatus, comprising: a laser emitting a light beam; a collimating lens converting the light beam emitted from the laser into a collimated light; a first half mirror separating the collimated light into a first reflected collimated light and a first transmitted collimated light; a first rod lens disposed on an optical path of the first reflected collimated light; a second half mirror disposed on an optical path of the first transmitted collimated light and separating the first transmitted collimated light into a second reflected collimated light and a second transmitted collimated light; a second rod lens disposed on an optical path of the second reflected collimated light; a third rod lens disposed on an optical path of the second transmitted collimated light; and a support portion supporting the laser, the collimating lens, the first and second half mirrors, and the first, second, and third rod lenses, wherein each of the first rod lens, second rod lens, and third rod lens includes a rod lens main body substantially cylindrical in shape with a circumferential side surface extending along a corresponding axis and generating a transmitted light by transmitting at least a portion of the corresponding collimated light, and wherein a light separating portion is formed on a portion of the circumferential side surface of at least one of the first, second, and third rod lenses, the light separating portion separating the corresponding collimated light into a transmitted light and a reflected light, thereby generating a line beam made from the transmitted light and the reflected light.

According to another aspect, the present invention provides a laser marking apparatus, comprising: a laser emitting a light beam; a collimating lens converting the light beam emitted from the laser into a collimated light; a first half mirror separating the collimated light into a first reflected collimated light and a first transmitted collimated light; a first rod lens disposed on an optical path of the first reflected collimated light; a second half mirror disposed on an optical path of the first transmitted collimated light and separating the first transmitted collimated light into a second reflected collimated light and a second transmitted collimated light; a second rod lens disposed on an optical path of the second reflected collimated light; a third rod lens disposed on an optical path of the second transmitted collimated light; and a support portion supporting the laser, the collimating lens, the first and second half mirrors, and the first, second, and third rod lenses, wherein each of the first rod lens, second rod lens, and third rod lens includes a rod lens main body substantially cylindrical in shape with a circumferential side surface extending along a corresponding axis and generating a transmitted light by transmitting at least a portion of the corresponding collimated light, and wherein a light reflecting region is formed over a part of the circumferential side surface of at least one of the first, second, and third rod lenses along the circumferential direction and receives and reflects a portion of the incident collimated light, the corresponding rod lens main body including a transmitting region which receives and transmits the remaining portion of the incident light.

BRIEF DESCRIPTION OF THE DRAWINGS

The above and other objects, features and advantages of the invention will become more apparent from reading the following description of the preferred embodiments taken in connection with the accompanying drawings in which:

FIG. 11 is an explanatory diagram showing how a light separating surface of the rod lens in FIG. 10(B) transmits a portion of the incident light and reflects the remainder;

DESCRIPTION OF THE PREFERRED EMBODIMENTS

A rod lens, a line-beam generating optical system, and a laser marking apparatus according to preferred embodiments of the present invention will be described with reference to the accompanying drawings.

First Embodiment

A rod lens, a line-beam generating optical system, and a laser marking apparatus according to a first embodiment of the present invention will be described with reference to FIGS. 2(A) through 9.

Figure 1:
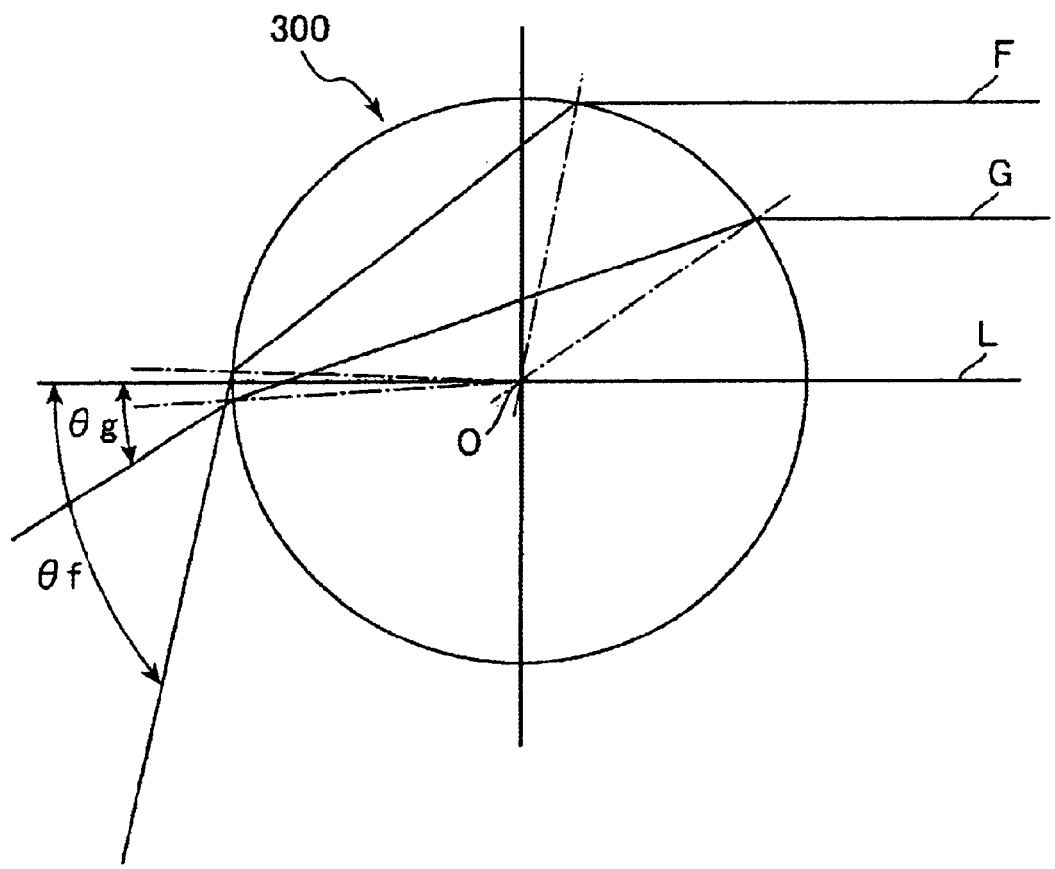
FIG. 1 is an explanatory diagram showing the principles of a conventional rod lens.
Figure 2A:
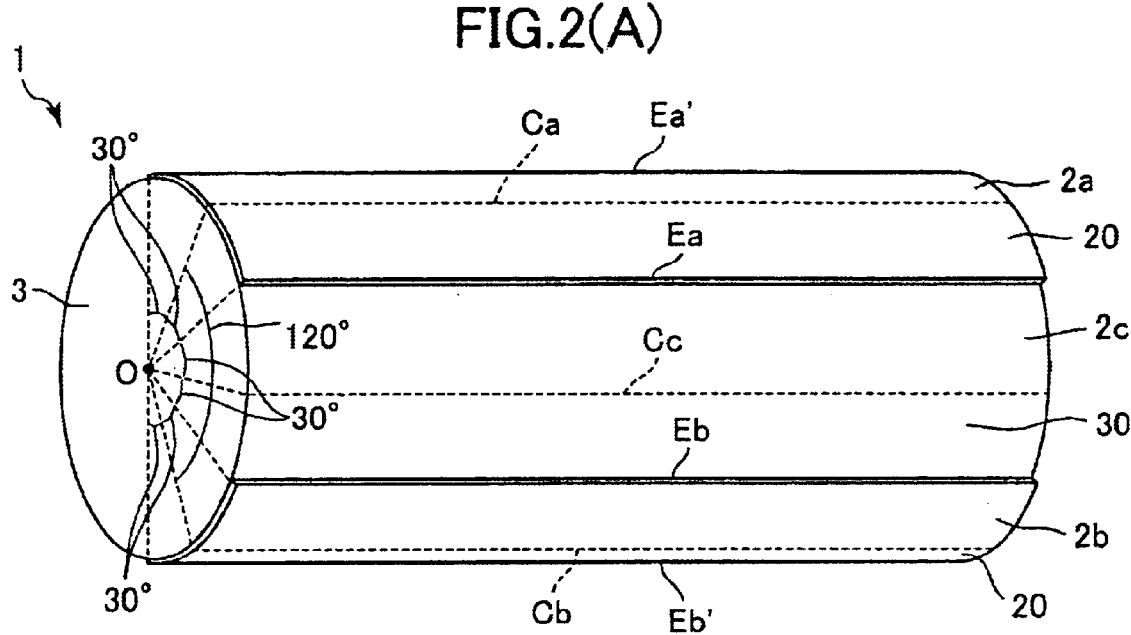
FIG. 2(A) is a perspective view of a rod lens according to a first embodiment.
Figure 2B:
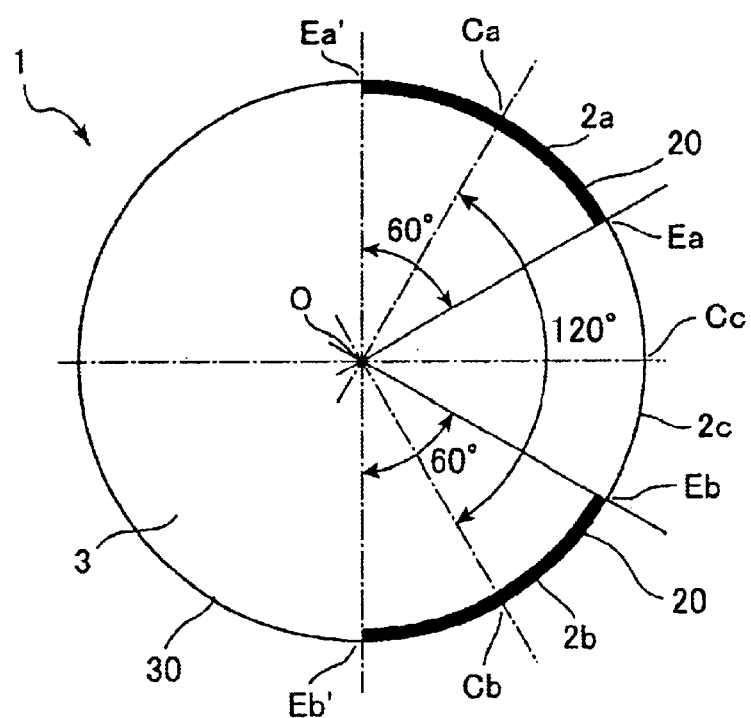
FIG. 2(B) is a cross-sectional view of the rod lens of FIG. 2(A)

FIG. 2(A) shows a perspective view of a rod lens 1 according to the first embodiment. FIG. 2(B) shows a cross-section of the rod lens 1 taken perpendicular to an axis O of the rod lens 1. The rod lens 1 includes a rod lens main body 3 having a substantially cylindrical shape that is elongated in a direction perpendicular to the surface of the drawing of FIG. 2(B). A side surface 30 extends along the axis O of the rod lens main body 3, encircling the axis O as a circumferential surface. Two reflecting surfaces 2a and 2b are formed on portions of the side surface 30 in the circumferential direction.

In this example the rod lens main body 3 is formed of BK7, which is one type of glass material having a refractive index of 1.5. The rod lens main body 3 has a diameter of 2 mm and a length of 15 mm. Each of the reflecting surfaces 2a and 2b includes a light reflecting film 20 formed on the side surface 30. The light reflecting film 20 is a metal film formed of Cr, Al, or the like having a reflectance of approximately 100%. The metal film is deposited on the side surface 30 by a vacuum deposition method, a sputtering method, or the like.

The reflecting surface 2a extends parallel to the axis O and has a centerline Ca also extending parallel to the axis O. The reflecting surface 2b also extends parallel to the axis O and has a centerline Cb extending parallel to the axis O. The centerline Ca and centerline Cb are separated on the side surface 30 by an angle of 120° around the axis O. The reflecting surface 2a covers an angle of 60° around the axis O and is centered on the centerline Ca. The reflecting surface 2b covers an angle of 60° around the axis O and is centered on the centerline Cb. The light reflecting film 20 is not formed on the side surface 30 in the region between the reflecting surface 2a and reflecting surface 2b. The region between the reflecting surface 2a and reflecting surface 2b is referred to as a transparent surface 2c. The transparent surface 2c has a reflectance of about several percents. The transparent surface 2c extends parallel to the axis O and has a centerline Cc extending parallel to the axis O. The centerline Cc is separated from both the centerline Ca and the centerline Cb by an angle of 60°. The transparent surface 2c covers an angle 60° about the axis O and is centered on the centerline Cc. In this way, the reflecting surface 2a, transparent surface 2c, and reflecting surface 2b are formed on a portion of the side surface 30 accounting for 180° around the axis O, or half of the total 360°.

Figure 3:
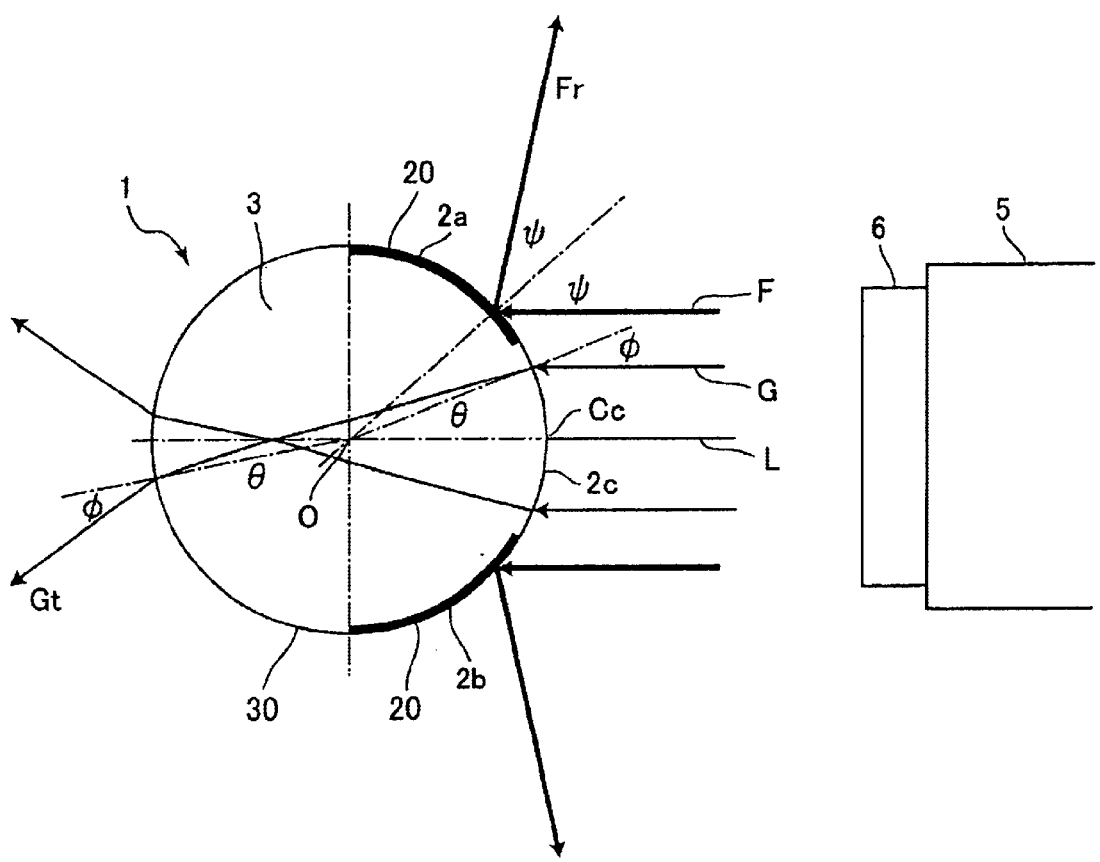
FIG. 3 is an explanatory diagram showing how the rod lens of FIG. 2(B) transmits a portion of an incident light and reflects the remainder.

The rod lens 1 having this construction is disposed next to a semiconductor laser 5 and a collimating lens 6, as shown in FIG. 3. An optical axis L of the semiconductor laser 5 and collimating lens 6 perpendicularly intersects both the centerline Cc of the transparent surface 2c and the axis O. Accordingly, the reflecting surface 2a, transparent surface 2c, and reflecting surface 2b are positioned on a light incident surface side of the side surface 30 confronting the collimating lens 6. The diameter of a circular cross-section, perpendicular to the optical axis L, of the laser beam emitted from the collimating lens 6 is set substantially equal to the cross-sectional diameter of the rod lens main body 3.

Of the laser beam emitted from the collimating lens 6, the inner portion of the beam travels along those optical paths that are near the optical axis L in a plane (the surface of the drawing) that is perpendicular to the axis O and that includes the optical axis L, while the outer portions of the beam travel in other optical paths farther from the optical axis L. The inner portion of the beam falls incident on the transparent surface 2c, while the outer portions of the beam fall incident on the reflecting surface 2a and reflecting surface 2b. The reflecting surface 2a and reflecting surface 2b reflect nearly all the incident light, that is, about 100%. The transparent surface 2c transmits most of the incident light.

Now assume that there is a light G near the optical axis L in the laser beam emitted from the collimating lens 6 that is incident on the transparent surface 2c. The light G is refracted according to the Snell's law, travels through the rod lens main body 3, and is emitted from the surface on the opposite side of the rod lens main body 3 as an outgoing light Gt. Since the rod lens main body 3 does not have a refractive effect in the axis O direction (direction perpendicular to the surface of the drawing of FIG. 3), light incident on the rod lens main body 3 is converted to a wide line beam spreading or expanding only in one direction, that is, the direction along the plane of the drawing.

In other words, if $\phi$ is the incidence angle at which the light G is incident on the lens main body 3 at the transparent surface 2c, $\theta$ is the angle of refraction inside the lens, n is the index of refraction for the rod lens 1, and the refractive index of air is 1, then from Snell's law, the following equation (1) is satisfied.

$$1 \sin \phi = n \sin \theta \quad (1);$$

According to the relationship shown in equation (1), the angle formed by the outgoing light Gt with the normal line is $\phi$. Since the values of $\phi$ and $\theta$ change slightly when the position on which the light G is incident on the transparent surface 2c changes slightly, the outgoing light Gt obtained by light incident on various positions of the transparent surface 2c spreads radially around the axis O.

Assume that there is another light F further from the optical axis L in the laser beam emitted from the collimating lens 6 that is incident on the reflecting surface 2a or the reflecting surface 2b at an incidence angle $\phi$. The light F reflects off the reflecting surface 2a or reflecting surface 2b at a reflecting angle $\phi$ equivalent to the incident angle $\phi$, and becomes an outgoing light Fr. The value of $\phi$ changes slightly when the position at which the light F is incident on the reflecting surface 2a (reflecting surface 2b) changes slightly. Therefore, the outgoing light Fr obtained by light incident on various positions of the reflecting surface 2a (reflecting surface 2b) spreads radially around the axis O.

Figure 4:
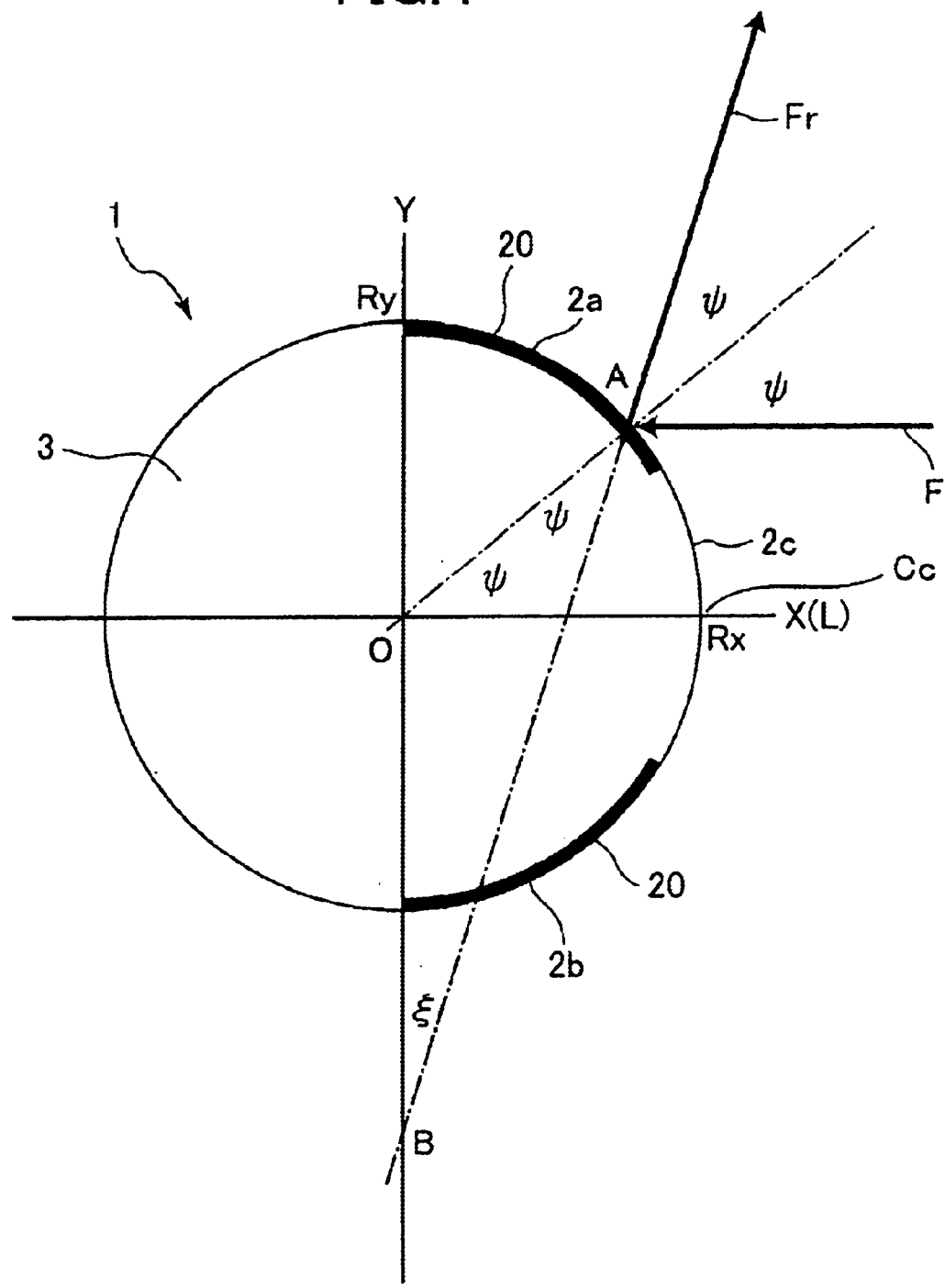
FIG. 4 is an explanatory diagram showing the direction in which light is reflected off of the light reflecting surface of the rod lens in FIG. 2(B)

FIG. 4 shows when the light F is incident at an arbitrary point A on the reflecting surface 2a at an incidence angle $\phi$ and is reflected at a reflected angle $\phi$. In the drawing, the x-axis is equivalent to the optical axis L, and the y-axis runs in a direction perpendicular to the axis O and the x-axis (L). Since the $\angle AORx$ in FIG. 4 is angled along the slope of the normal at the point A, the following equation is satisfied: $\angle AORx = \phi$.

Since the $\angle OAB$ is related to the reflected angle $\phi$ by alternate angles, the following equation is satisfied: $\angle OAB = \phi$.

Now, the $\angle OBA$ that the outgoing light Fr forms with the y-axis is referred to as $\xi$. The following equation is satisfied: $\angle AOB = \phi + \pi/2$. The sum of angles in the triangle OAB is expressed by $\angle AOB + \angle OAB + \angle OBA$.

Accordingly, the following equation is satisfied: $(\phi + \pi/2) + \phi + \xi = \pi$.

This equation can be rewritten as follows:

$$\xi = \pi/2 - 2\phi \quad (2).$$

Hence, the angle $\xi$ formed by the outgoing light Fr and the y-axis can be calculated by equation (2).

Figure 5:
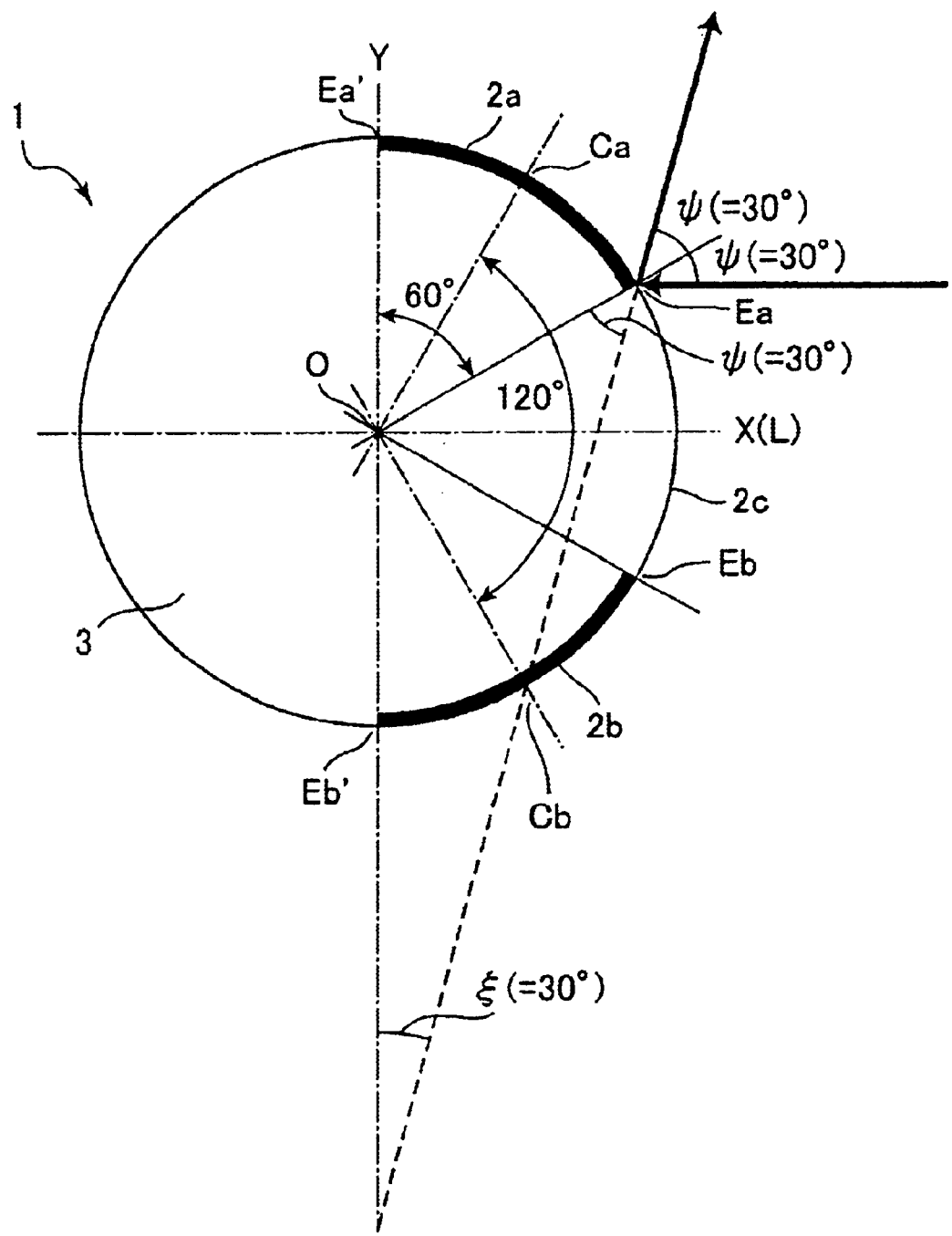
FIG. 5 is an explanatory diagram showing how an edge of the light reflecting surface in FIG. 2(B) reflects incident light.

As shown in FIG. 5, the reflecting surface 2a and reflecting surface 2b of the present embodiment are positioned such that their centerline Ca and centerline Cb are separated by an angle of 120°. Each of the reflecting surfaces 2a and 2b covers an angular area of 60°. The edge of the reflecting surface 2a on the transparent surface 2c side is Ea and the edge of the reflecting surface 2a on the opposite side is Ea'.

Similarly, the edge of the reflecting is surface 2b on the transparent surface 2c side is Eb while the edge of the reflecting surface 2b on the opposite side is Eb'. The edges Ea, Ea', Eb, and Eb' extend along the axis O. The edges Ea' and Eb' are positioned on the y-axis.

The angle of the normal at edge Ea is 30°. Hence, the angle ξ formed by the reflected light generated at the edge Ea and the y-axis is ξ=90°−2×30°=30°.

Figure 6:
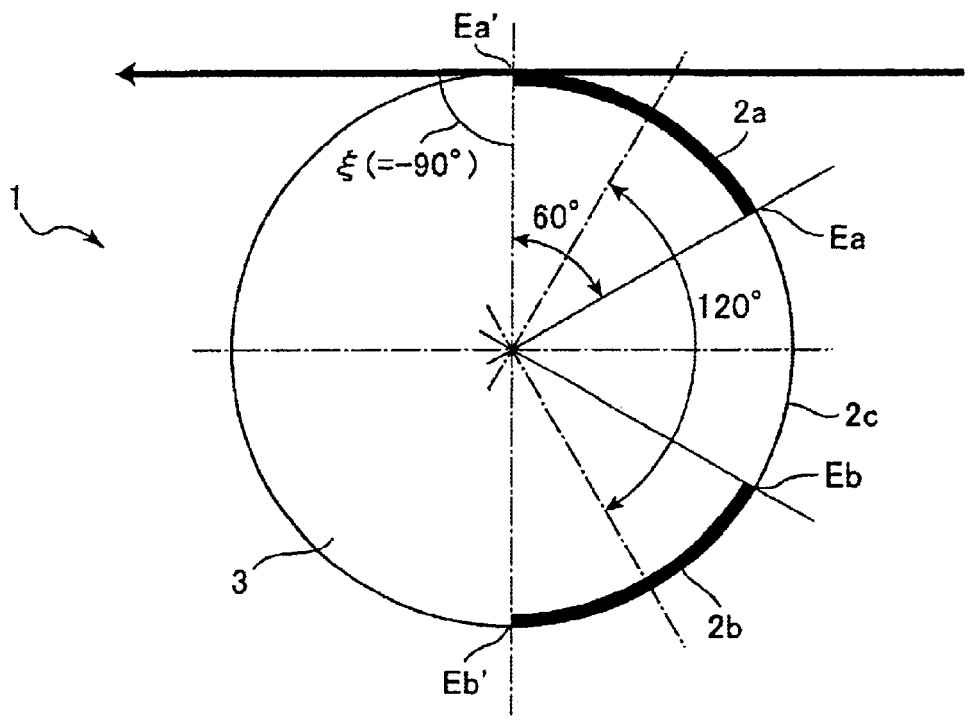
FIG. 6 is an explanatory diagram showing how the incident light passes near the other edge of the light reflecting surface in FIG. 2(B)

As shown in FIG. 6, the angle of the normal at the other edge Ea' is 90°. Hence the angle ξ formed by the incident light that passes near the edge Ea' and the y-axis is ξ=90°−2×90°=−90°.

In other words, light incident at the edge Ea is reflected at an angle of 30° to the light source side (right side in FIG. 5), while light incident near the edge Ea' travels in a direction 90° toward the opposite side of the light source (left side in FIG. 6). Hence, the spreading angle of the line beam formed by the reflecting surfaces 2a and 2b is (90°+30°)×2=240°.

Therefore, by combining the line beam formed by the reflecting surfaces 2a and 2b and the line beam formed by light that falls incident on the transparent surface 2c and that is retracted thereat, it is possible to obtain a line beam having a wide angle of about 240°.

Figure 7:
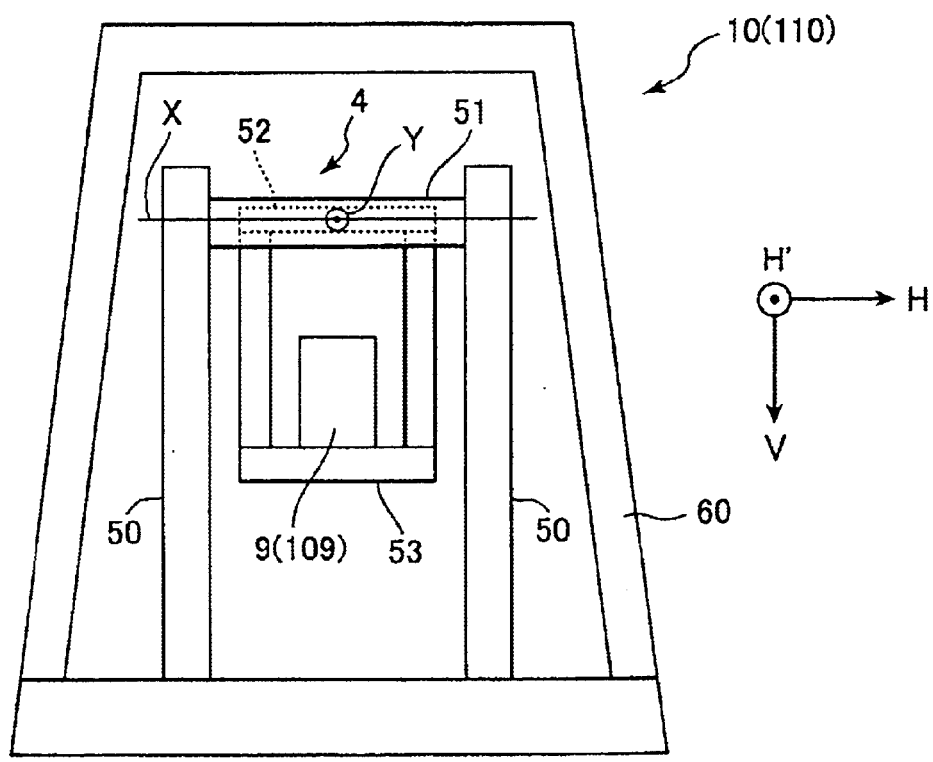
FIG. 7 is a side view showing a laser marking apparatus according to the first embodiment of the present invention.

FIG. 7 shows a laser marking apparatus 10 according to the first embodiment.

Specifically, the laser marking apparatus 10 includes: a line-beam generating optical system 9 according to the present embodiment, a support mechanism 4 for keeping the line-beam generating optical system 9 level or horizontal, and a case 60 covering the line-beam generating optical system 9 and support mechanism 4.

The support mechanism 4 employs a gimbal mechanism well known in the art. The gimbal mechanism includes a support frame 50, a large ring 51, a small ring 52, and a mounting platform 53. The large ring 51 is capable of pivoting around one horizontal H-axis in relation to the support frame 50 by means of bearings (not shown). The small ring 52 is capable of pivoting around another horizontal H'-axis (perpendicular to the H-axis and therefore perpendicular to the surface of the drawing) in relation to the large ring 51 by means of bearings (not shown) The mounting platform 53 is fixed to the small ring 52 and supports the line-beam generating optical system 4. With this construction, the mounting platform 53, on which the line-beam generating optical system 9 is mounted, can be maintained level or horizontal.

Figure 8:
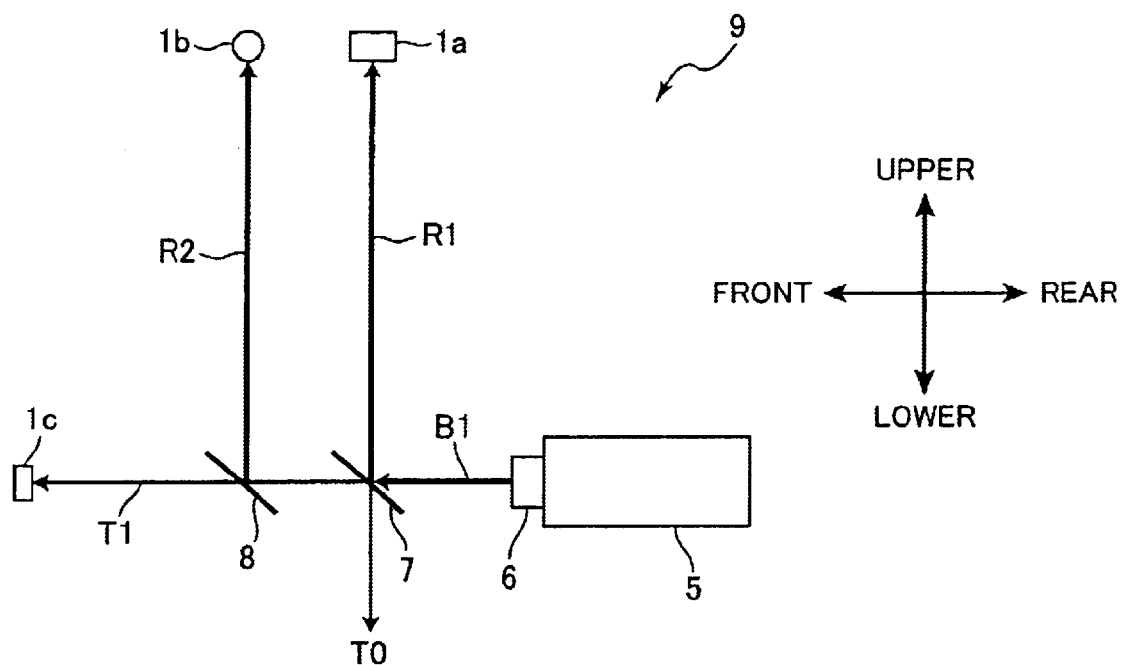
FIG. 8 is a side view showing a line-beam generating optical system, according to the first embodiment of the present invention, which is mounted in the laser marking apparatus of FIG. 7.

FIG. 8 shows a side view of the line-beam generating optical system 9. The line-beam generating optical system 9 includes a semiconductor laser 5, a collimating lens 6, a first half mirror 7, a second half mirror a, and rod lenses 1a, 1b, and 1c. The rod lenses 1a, 1b, and 1c have the same structure as the rod lens 1. The semiconductor laser 5 is disposed with its optical axis oriented horizontally. The collimating lens 6 converts a laser beam emitted from the semiconductor laser 5 into a collimated light B1 having a beam shape with a circular cross-section. In this example, the diameter of the collimated light B1 is set to 2 mm.

The first half mirror 7 and the second half mirror 8 are sequentially disposed along the optical path of the collimated light B1 and oriented at an angle of 45° to the optical axis.

The first half mirror 7 reflects 33% of incident light as a reflected light R1 and transmits the remaining 67% of the incident light. The reflected light R1 travels along a vertically upward path. The rod lens 1a is positioned on the optical path of the reflected light R1. The rod lens 1a is disposed such that its axis is horizontal and parallel to the optical axis of the semiconductor laser 5. When incident on the rod lens 1a, the reflected light R1 is converted to a line beam. This line beam spreads over an angle of about 240° along a plane that is orthogonal to the surface of the drawing and that includes the optical axis of the reflected light R1.

Further, several percent of the reflected light R1 that is perpendicularly incident on the rod lens 1a is reflected by the rod lens 1a at the reflected angle of 0°. Hence the reflected light returns along the same optical path and once again enters the first half mirror 7. 67% of the light that returns to the first half mirror 7 is transmitted therethrough as a transmitted light T0. The transmitted light T0 travels vertically downward as a ground marking light. Although the intensity of the transmitted light T0 is several percent of the light perpendicularly incident on the rod lens 1a, the transmitted light T0 is easy to see because the light T0 is being used as a dot beam rather than a line beam.

Of the 67% of the collimated light B1 that passes through the first half mirror 7, 50% of this light is reflected by the second half mirror 8 as a reflected light R2, while the other 50% of this light is transmitted as a transmitted light T1. The reflected light R2 travels in a vertically upward direction. The rod lens 1b is disposed on the optical path of the reflected light R2 with its axis horizontal and orthogonal to the optical axis of the semiconductor laser 5, that is, perpendicular to the surface of the drawing. When incident on the rod lens 1b, the reflected light R2 is converted to a line beam having an angle of approximately 240° in the same plane as the surface of the drawing that includes the optical axis of the reflected light R2.

The rod lens 1c is disposed downstream from the second half mirror 8 with its axis running along the surface of the drawing in a vertical direction perpendicular to the optical axis of the semiconductor laser 5. When the transmitted light T1 that passes through the second half mirror 5 is incident on the rod lens 1c, the transmitted light T1 is converted to a line beam having an angle of approximately 240° within a plane that is orthogonal to the surface of the drawing and that includes the optical axis of the transmitted light T1.

Figure 9:
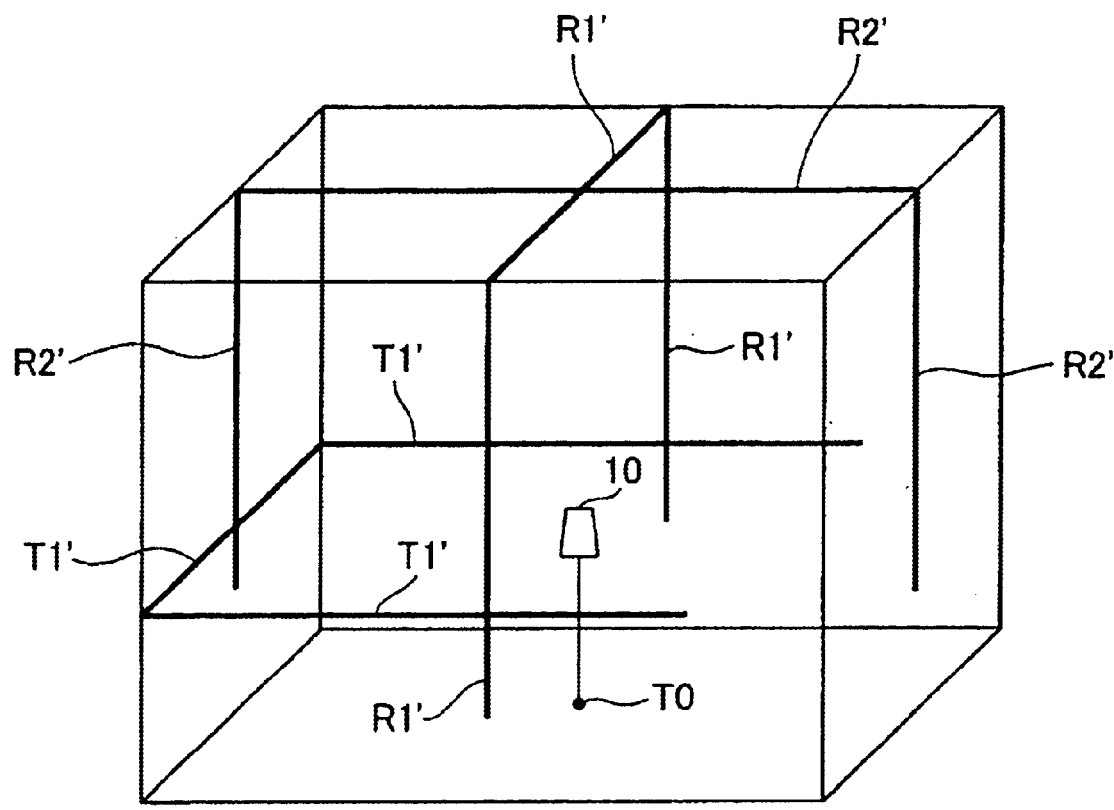
FIG. 9 is an explanatory diagram showing line beams generated by the laser marking apparatus of FIG. 7 equipped with the line-beam generating optical system of FIG. 8.
Figure 9:
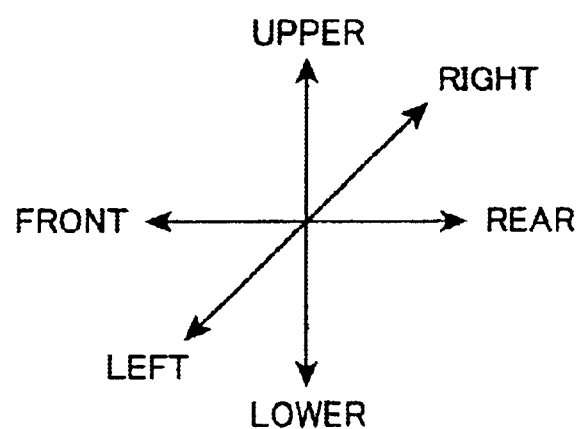

FIG. 9 is an explanatory diagram showing line beams irradiated from the laser marking apparatus 10 that maintains the line-beam generating optical system 9 of FIG. 8 level, that is, in the horizontal state shown in FIG. 8.

A line beam R1' is formed based on the reflected light R1. The line beam R1' forms a vertical line beam on the left and right of the laser marking apparatus 10 and a horizontal line beam above the laser marking apparatus 10 in the left-to-right direction A line beam R2' is formed based on the reflected light R2. The line beam R2' forms a vertical line beam in the front and back of the laser marking apparatus 10 and a horizontal line beam above the laser marking apparatus 10 and extending in the front to back direction. A line beam T1' is formed based on the transmitted light T1. The line beam T1' forms a horizontal line beam on the left, right, and front sides of the laser marking apparatus 10. The transmitted light T0 forms a ground mark directly under the laser marking apparatus 10.

It is possible to modify the directions in which the reflected light R1, reflected light R2, or transmitted light T1 are emitted by adding mirrors or other optical elements to the line-beam generating optical system 9.

The rod lens 1 according to the embodiment described above can produce a line beam of a very wide angle by a simple construction. Further, by equipping the line-beam generating optical system 9 with the rod lenses 1, it is possible to easily produce a plurality of wide line beams from a single light source. Accordingly, a plurality of laser line beams for marking can be produced at a low cost. As a result, the present embodiment can provide a low cost laser marking apparatus capable of irradiating a plurality of line beams.

While the rod lenses 1a, 1b, and 1c in the line-beam generating optical system 9 of the present embodiment each has the light reflecting surfaces 2a and 2b, it is possible to provide only one or two of the rod lenses 1a, 1b, 1c with the light reflecting surfaces 2a, 2b.

Further, the line-beam generating optical system 9 does not necessarily need to be provided with the collimating lens 6 as described above.

The light reflecting film 20 is also not limited to a metal film, provided that the material of the light reflecting film 20 has a reflectance of approximately 100%.

The diameter of the circular cross-section of the laser beam from the collimating lens 6 may be set greater than the cross-sectional diameter of the rod lens main body 3.

Second Embodiment

Next, a rod lens, a line-beam generating optical system, and a laser marking apparatus according to a second embodiment of the present invention will be described with reference to FIGS. 10(A) through 14.

Figure 10A:
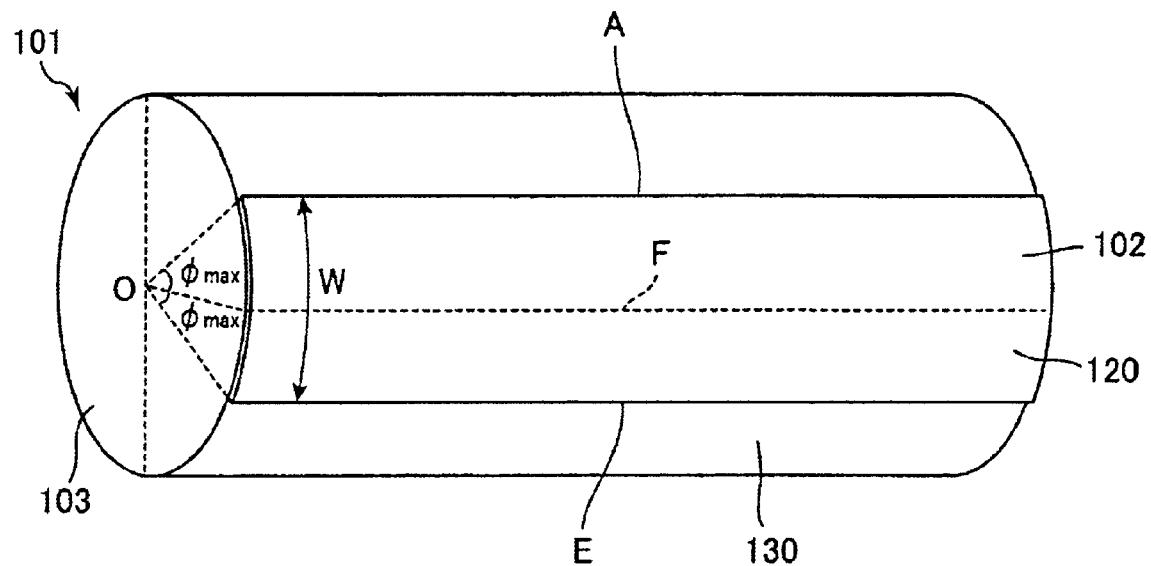
FIG. 10(A) is a perspective view of a rod lens according to a second embodiment of the present invention.
Figure 10B:
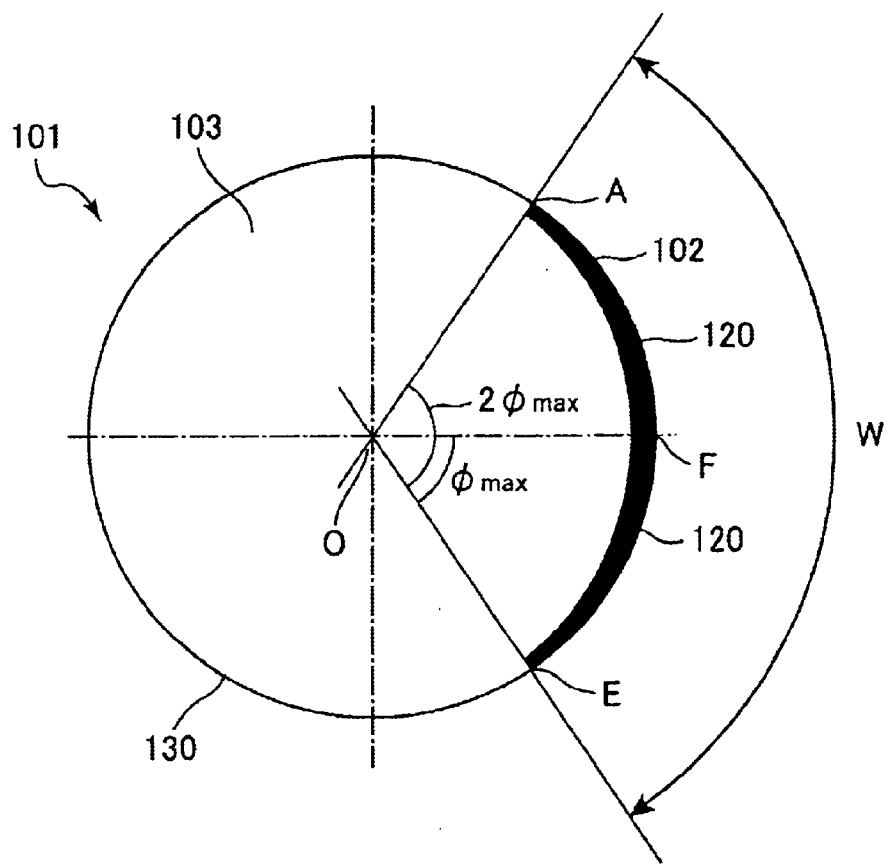
FIG. 10(B) is a cross-sectional view of the rod lens of FIG. 10(A)

FIG. 10(A) shows a perspective view of a rod lens 101 according to the second embodiment. FIG. 10(B) shows a cross-section of the rod lens 101 taken perpendicular to an axis C of the rod lens 101. The rod lens 101 includes a rod lens main body 103 having a substantially cylindrical shape that is elongated in a direction perpendicular to the surface of the drawing of FIG. 10(B). A side surface 130 of the rod lens main body 103 extends along the axis O and encircles the axis O as a peripheral surface. A light separating surface 102 is formed on a portion of the side surface 130 in the circumferential direction. As in the first embodiment, the rod lens main body 103 in this example is formed of BK7, which is a material having a refractive index of 1.5.

The light separating surface 102 includes a light separating film 120 formed on the side surface 130. The light separating film 120 has a predetermined reflectance, such as 50%, and a predetermined transmittance, such as 50%. The light-separating film 120 can be formed of any material, provided the material can separate incident light into transmitted light and reflected light. However, it is desirable that the light-separating film 120 be formed of a metal, such as Cr or Al, or a dielectric material, such as $TiO_2$, $SiO_2$, or $MgF_2$. The light-separating film 120 is formed as a single layer or multiple layer film from these materials. Multiple layer constructions may include a multiple metal layer formed by laminating metal films, a multiple dielectric layer formed by laminating dielectric material films, and a hybrid layer formed by laminating metal film with dielectric film. In the present embodiment, the light-separating film 120 is a single layer dielectric film.

The light separating surface 102 is formed on the side surface 130 covering a predetermined angular area W in the circumferential direction about the axis O and extending parallel to the axis O. The angular area W covers a predetermined angle 2 φ max around the axis O. Here, the angle 2 φ max is a value that satisfies both of $$4\phi max - 2\sin^{-1}\left(\frac{\sin\phi max}{n}\right) - \pi \geq 0$$

and 2 φ max ≤ π for the refractive index n of the rod lens main body 103. Since the refractive index n is 1.5 in this example, the angle 2 φ max is greater than or equal to 126.6° and smaller than or equal to 180°. Accordingly, the light separating surface 102 occupies a predetermined ratio (in this case, greater than or equal to 35.17% and smaller than or equal to 50%) of the entire periphery of the side surface 130.

The light separating surface 102 includes a pair of edges A and E and a centerline F. The edge A, edge E, and centerline F all extend parallel to the axis O. The edge A and edge E are separated by exactly the angle 2 φ max. The centerline F is separated from the edge A and the edge E by exactly an angle φ max.

As shown in FIG. 11, the rod lens 101 with this construction is disposed next to the semiconductor laser 5 and the collimating lens 6. The optical axis L of the semiconductor laser 5 and the collimating lens 6 intersects the centerline F of the light separating surface 102 perpendicularly and also intersects the axis O perpendicularly. Therefore, the light separating surface 102 is positioned on a light incident surface side of the side surface 130 opposing the collimating lens 6. The diameter of a circular cross-section, perpendicular to the optical axis L, of the laser beam emitted from the collimating lens 6 is set substantially equal to the cross-sectional diameter of the rod lens main body 103. The light separating surface 102 separates light from the laser beam emitted from the collimating lens 6 incident on the light separating surface 102 into a transmitted light and a reflected light.

Of the light incident on the light separating surface 102, 50% is reflected by the light separating surface 102 to form a portion of a line beam, while the remaining 50% passes into the rod lens main body 103 as a transmitted light. The transmitted light refracts according to Snell's law, travels through the rod lens main body 103, and is outputted from the opposite side. Since the rod lens main body 103 does not have a refractive effect in the axial direction, light incident on the rod lens main body 103 is converted to a line beam that spreads out only in a single direction along the surface of the drawing.

The rod lens 101 according to the present embodiment can form a line beam having a spread of nearly 360°. This will be described in greater detail below.

Now assume a light G in the laser beam emitted from the collimating lens 6 that travels along a certain optical path and is incident on the light separating surface 102. As shown in FIG. 11, 50% of the light G is transmitted through the light separating surface 102. If φ is the incident angle of the light G on the rod lens 101, θ is the angle of refraction within the lens, n is the refractive index of the rod lens main body 103, and the refractive index of air is 1, then according to Snell's law, the following equation is satisfied: 1 sin φ=n sin θ.

Most of a part of the light G that enters the rod lens main body 103 is outputted as an outgoing beam $G_T$ from the side surface 130 on the opposite side, where no light separating surface 102 is formed. The angle formed by the outgoing beam $G_T$ and the normal at the output point of the outgoing beam $G_T$ is φ.

It is noted that when the light passes through the light separating film 120 in the light separating surface 102, according to the Snell's law, the refractive index of the light separating film 120 affects the traveling path of the light. However, the light separating film 120 has a refractive index of about 1.3–1.6, which is near the refractive index 1.5 of the lens material, and is extremely thin. Accordingly, any small offset in the optical path of the light caused when passing through the light separating film 120 can be considered negligible. Hence, in practical calculation it is possible to ignore the effects of the refractive index of the light separating film 120.

The values for φ and θ change slightly according to the position at which the light G is incident on the light separating surface 102. For example, an outgoing light $G_T'$ obtained from another light G' that is further outside the optical axis L than the light G (in other words, that is on the upper side of the light G in the drawing) is more greatly refracted than the outgoing beam $G_T$ produced from the light G. Accordingly, a line beam spreading about 180° can be obtained from the overall part of the laser beam that has transmitted through the light separating surface 102.

The remaining 50% of the light G incident on the light separating surface 102 is reflected at a reflected angle φ to form a reflected light $G_R$. The value of φ changes slightly according to the position in which the light G is incident on the light separating surface 102. For example, a reflected light $G_R'$ obtained from the light G' further outside the optical axis L than the light G (in other words, that is on the upper side of the light G in the drawing) is reflected at an angle greater than the reflected light $G_R$ produced from the light G. Hence, a line beam spreading about 180° can be obtained from the entire part of the laser beam that has been reflected by the light separating surface 102. Therefore a line beam having a span of nearly 360° can be obtained by combining the line beam formed by the transmitted light and the line beam formed by the reflected light. In this way, the rod lens 101 of the present embodiment can produce a line beam with a large spreading angle of greater than or equal to 180° and smaller than or equal to 360°.

In the present embodiment, the angle 2 φ max for the angular area W satisfies the conditions of $$4\phi\max - 2\sin^{-1}\left(\frac{\sin\phi\max}{n}\right) - \pi \geq 0$$

and 2 φ max ≤ π for a refractive index n of the rod lens main body 103. Accordingly, a portion of the line beam formed by the reflected light overlaps the line beam formed by the transmitted light. In other words, no gap is formed between the line beam generated by the reflected light and the line beam generated by the transmitted light. Accordingly, the present embodiment can irradiate a line beam on the wall surfaces without breaks.

This will be described in greater detail with reference to FIG. 12.

Figure 12:
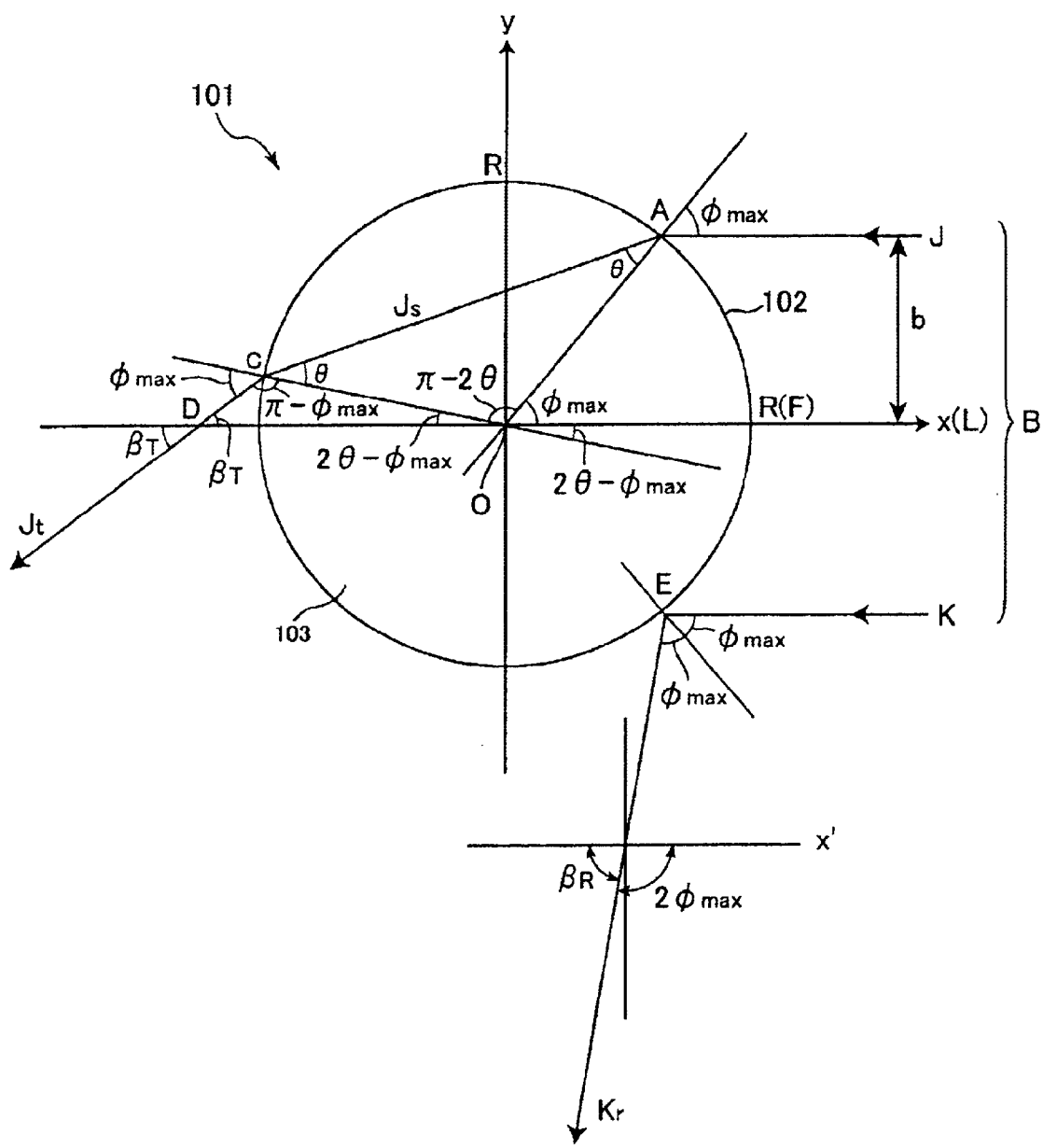
FIG. 12 is an explanatory diagram showing the relationship between a reflected light generated on one edge of the light separating surface in FIG. 10(B) and a transmitted light generated on the other edge.

As shown in FIG. 12, a laser beam B with an optical axis L (x-axis) falls incident on the rod lens 101. Here, the y-axis extends in a direction perpendicular to both of the axis O of the rod lens main body 103 and the x-axis (L). Of the laser beam B, lights J and K equidistant from the x-axis (L) are incident on both edges A and E of the light separating surface 102.

The light J is incident on the edge A at an incidence angle of φ max. The light J travels as a light $J_S$ into the lens at a refractive angle θ according to Snell's law and is outputted at a point C as a transmitted light $J_t$ forming an outgoing angle φ max with the normal. Reflected light from the light J is also generated at the edge A but is omitted from the drawing for simplicity. Similarly, the light K is incident on the edge E at an incidence angle φ max and is reflected at a reflected angle φ max as a reflected light $K_r$. A transmitted light from the light R is also generated at the edge E but is omitted from the drawing for simplicity.

The angle formed between the transmitted light $J_t$ and the x-axis is referred to as $β_T$ and the angle formed between the reflected light $K_r$ and the x-axis (x'-axis) is referred to as $β_R$.

For the transmitted light $J_r$ and reflected light $K_r$ to overlap, the following condition (101) must be met:

$$β_R \leq β_T \tag{101}$$

From the drawing, the following equation is obtained for the reflected light $K_r$:

$$β_R = π - 2\phi\max \tag{102}$$

The light J traveling at a height of b from the x-axis is incident on the rod lens 101 at an angle φ max to the normal at the edge A. Since the y-coordinate for the edge A is b, and the cross section of the rod lens 101 (radius R) can be represented by the equation $x^2 + y^2 = R^2$, then the coordinates for the edge A are defined as: A ($\sqrt{R^2-b^2}$, b).

Since the line OA has a slope of "tanφ max" and passes through the point edge A, the equation for this line is: y=(tan φ max)·x. Accordingly, the following equation is satisfied: b=(tan φ max)·$\sqrt{R^2-b^2}$.

Hence, the following equation (103) is satisfied:

$$\phi\max = \tan^{-1}\left(\frac{b}{\sqrt{R^2 - b^2}}\right) \tag{103}$$

Now assume that light incident on the rod lens 101 at an incidence angle φ max refracts exactly by the angle of refraction θ and travels through the lens. If the refractive index of air is 1 and the refractive index of the lens material is n, then according to Snell's law, the following equation must be met:

$$1 \cdot \sin\phi\max = n \cdot \sin θ \tag{104}$$

Therefore, the following equation (105) is satisfied:

$$θ = \sin^{-1}\left(\frac{\sin\phi\max}{n}\right) \tag{105}$$

Then by substituting equation (103) into equation (105), the following equation (106) is obtained:

$$θ = \sin^{-1}\left(\frac{\sin\left(\tan^{-1}\frac{b}{\sqrt{R^2-b^2}}\right)}{n}\right) \tag{106}$$

Next, since the angle formed by the transmitted light $J_t$ outputted from the rod lens 101 and the x-axis is $β_T$, then the sum of the three angles in the triangle OCD is:

$$(π-\phi\max) + β_T + (2θ - \phi\max) = π.$$

Therefore, the following equation is obtained:

$$β_T = 2(\phi\max - θ) \tag{107}$$

Then, by substituting equations (103) and (106) into equation (107), the following equation is obtained:

$$β_T = 2\left(\tan^{-1}\left(\frac{b}{\sqrt{R^2-b^2}}\right) - \sin^{-1}\left(\frac{\sin\left(\tan^{-1}\frac{b}{\sqrt{R^2-b^2}}\right)}{n}\right)\right). \tag{108}$$

Here, if the ratio of the radius b of the incident beam to the radius R of the rod lens is defined as $$\tau(\%) = \frac{b}{R} \times 100,$$

then the following equation is obtained:

$$b = \frac{\tau R}{100}. \quad (109)$$

By substituting equation (108) into equation (109) the following equation is obtained.

$$\beta_T = 2\left(\tan^{-1}\left(\frac{\tau}{\sqrt{(100+\tau)(100-\tau)}}\right) - \sin^{-1}\left(\frac{\sin\left(\tan^{-1}\frac{\tau}{\sqrt{(100+\tau)(100-\tau)}}\right)}{n}\right)\right) \quad (110)$$

Here, $\tau$ and $\phi$max have the following relationship:

$$\tau = 100 \cdot \sin \phi \text{ max}.$$

By substituting this equation into equation (110), the following equation is obtained:

$$\beta_T = 2\left(\tan^{-1}\left(\frac{\sin\phi\text{max}}{\sqrt{(1+\sin\phi\text{max})(1-\sin\phi\text{max})}}\right) - \sin^{-1}\left(\frac{\sin\left(\tan^{-1}\frac{\sin\phi\text{max}}{\sqrt{(1+\sin\phi\text{max})(1-\sin\phi\text{max})}}\right)}{n}\right)\right). \quad (111)$$

To summarize, by combining equations (101) (102), (104), and (107), the following inequality (112) is obtained:

$$4\phi\text{max} - 2\sin^{-1}\left(\frac{\sin\phi\text{ max}}{n}\right) - \pi \geq 0 \quad (112)$$

wherein $\phi$ max$\leq \pi/2$.

Therefore, it is clear that a line beam with no breaks, that is, with the transmitted light overlapping a portion of the reflected light, can be obtained, provided that the values n and $\phi$ max ($\leq \pi/2$) satisfy equation (112). Since the refractive index n of the rod lens main body 103 is 1.5 in this example, $\phi$ max must be greater than or equal to 63.3° according to equation (112). Hence, the scope of the angle 2 $\phi$ max for the light separating surface 102 must be equal to or greater than 126.6°, which corresponds to 35.17% (=126.6°/360°) of the overall side surface 130 along the circumferential direction.

Figure 13:
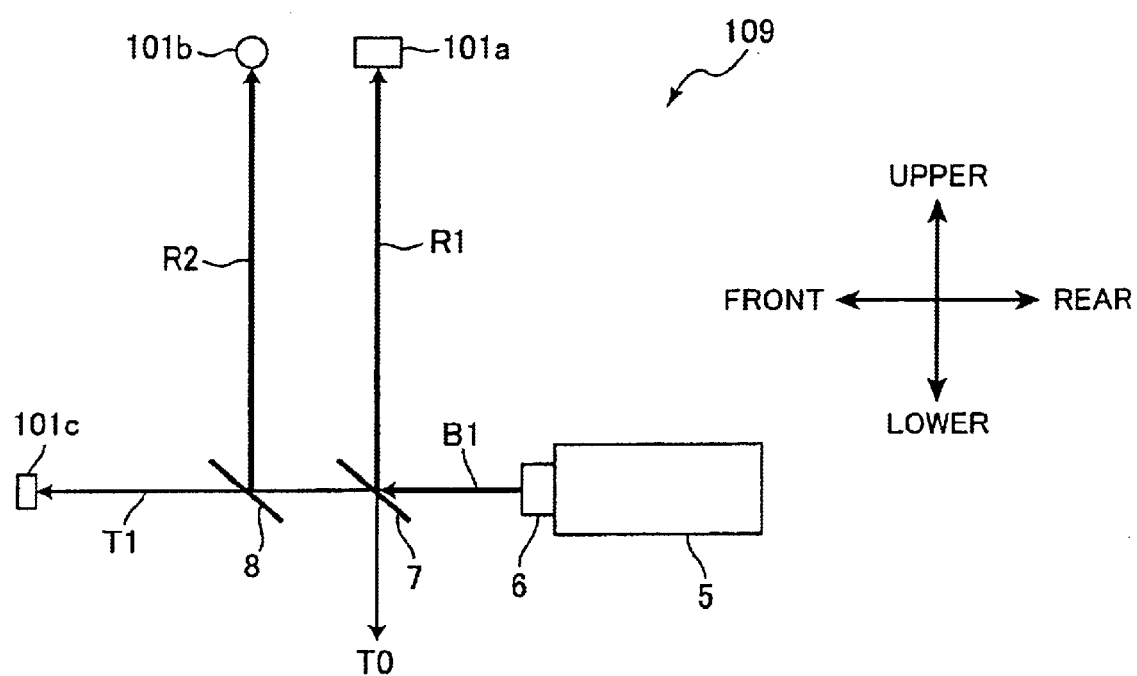
FIG. 13 is an explanatory diagram showing a line-beam generating optical system according to the second embodiment of the present invention.

FIG. 13 is a side view showing a line-beam generating optical system 109 according to the present embodiment.

As with the line-beam generating optical system 9 of the first embodiment (FIG. 8), the line-beam generating optical system 109 of the present embodiment includes the semiconductor laser 5, collimating lens 6, first half mirror 7, and second half mirror 8. In place of the rod lenses 1a, 1b, and 1c, the line-beam generating optical system 109 of the present embodiment includes rod lenses 101a, 101b, and 101c having the same structure as the rod lens 101. The semiconductor laser 5, collimating lens 6, first half mirror 7, and second half mirror 8 are disposed in the same position and the same orientation as the elements in the line-beam generating optical system 9 of the first embodiment. Further, the rod lenses 101a, 101b, and 101c are disposed in the same position and the same orientation as the rod lenses 1a, 1b, and 1c in the line-beam generating optical system 9 of the first embodiment. The rod lenses 101a, 101b, and 101c can each form line beams covering nearly 360°. When light is perpendicularly incident on the rod lens 101a, 50% of the light is reflected by the light separating surface 102 at a reflected angle of 0° as a ground marking light T0.

A laser marking apparatus 110 according to the present embodiment can be configured by mounting the line-beam generating optical system 109 according to the present embodiment in the laser marking apparatus 10 according to the first embodiment (FIG. 7) in place of the line-beam generating optical system 9.

Figure 14:
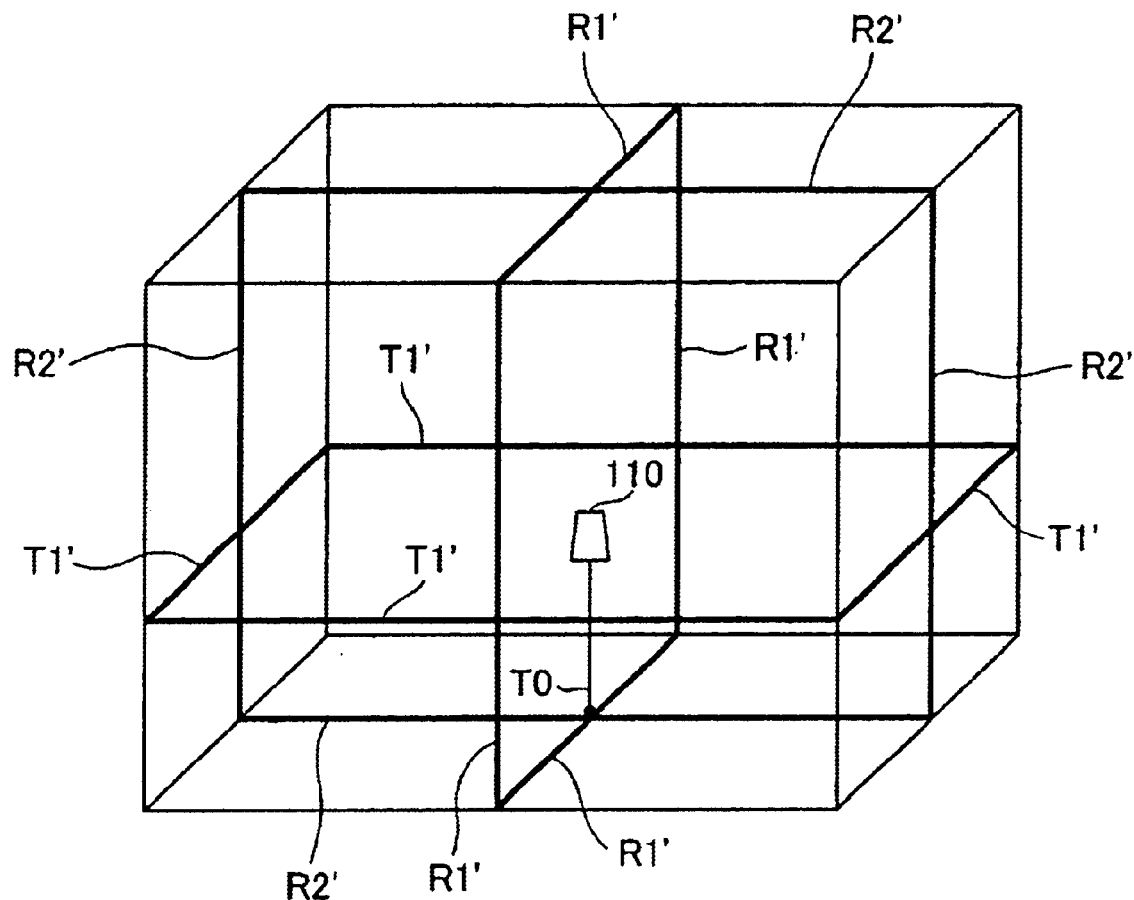
FIG. 14 is an explanatory diagram showing line beams generated by a laser marking apparatus equipped with the line-beam generating optical system of FIG. 13.
Figure 14:
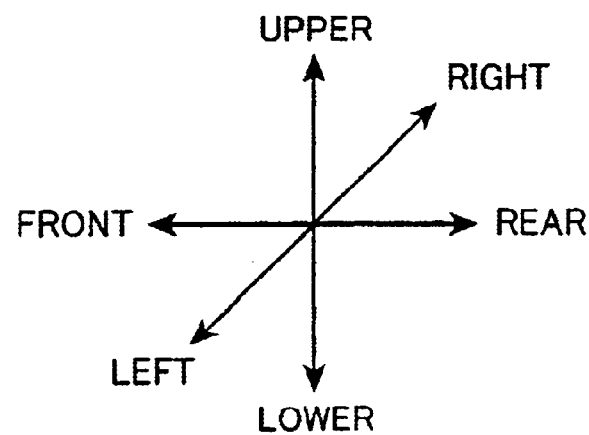

FIG. 14 is an explanatory diagram showing line beams irradiated from the laser marking apparatus 110 that maintains the line-beam generating optical system 109 of FIG. 13 level, that is, in the horizontal state shown in FIG. 14. A line beam R1' formed by the rod lens 101a based on the reflected light R1 forms vertical line beams on the left and right of the laser marking apparatus 110 and horizontal line beams above and below the laser marking apparatus 110 in the left to right direction. A line beam R2' formed by the rod lens 101b based on the reflected light R2 forms vertical line beams in the front and back of the laser marking apparatus 110 and horizontal line beams above and below the laser marking apparatus 110 and extending in the front to back direction. A line beam T1' formed by the rod lens 101c based on the transmitted light T1 forms horizontal line beams on the front, back, left, and right sides of the laser marking apparatus 110. In this way, each of the line beams R1', R2', and T1' span nearly 360°. Further, the transmitted light T0 forms ground marking light directly below the apparatus.

The rod lens 101 according to the embodiment described above can produce a wide-angled line beam of nearly 360° by a simple structure. Further, by equipping the line-beam generating optical system 109 with the rod lenses 101, it is possible to easily produce a plurality of wide line beams covering nearly 360° from a single light sources Accordingly, a plurality of laser line beams for marking can be produced at a low cost. As a result, the present embodiment can provide a low cost laser marking apparatus capable of irradiating a plurality of line beams.

While a dielectric film is used as the light separating film 120 in the embodiment described above, a metal film formed of Cr, Al, or the like can also be used as the light separating film 120.

While the rod lenses 101a, 101b, and 101c in the line-beam generating optical system 109 of the present embodiment each has the light separating surface 102, it is possible to provide only one or two of the rod lenses with the light sepaerating surface 102.

Further, the line-beam generating optical system 109 does not necessarily need to be provided with the collimating lens 6 as described above.

The diameter of the circular cross-section of the laser beam from the collimating lens 6 may be set smaller than the diameter of the rod lens main body 103 provided that the diameter of the laser beam is greater than or equal to the value "2b", that is, the distance between the edges A and E of the light separating surface 102 along the y axis in FIG. 12.

The diameter of the circular cross-section of the laser beam from the collimating lens 6 may be set greater than the diameter of the rod lens main body 103.

Third Embodiment

A rod lens, a line-beam generating optical system, and a laser marking apparatus according to a third embodiment of the present invention will be described with reference to FIGS. 15 through 21.

Figure 15:
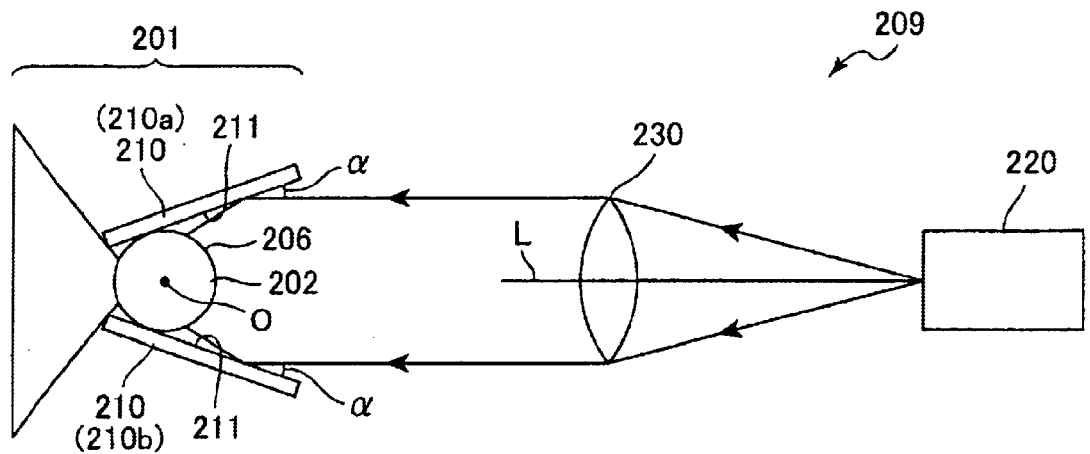
FIG. 15 is an explanatory diagram (side view) showing a line-beam generating optical system according to a third embodiment of the present invention.

FIG. 15 is a side view showing a line-beam generating optical system 209 according to the third embodiment. The line-beam generating optical system 209 includes a laser light source 220, such as a semiconductor laser, a collimating lens 230, and a rod lens 201.

The rod lens 201 includes a rod lens main body 202 and two mirrors 210. The rod lens main body 202 has an axis O running perpendicular to the surface of the drawing and a substantially cylindrical shape extending along the axis O. A side surface 206 of the rod lens main body 202 extending along the axis O encircles the axis O as a circumferential surface. In the present embodiment, neither a light reflecting film nor a light separating film is formed on the side surface 206. As in the first embodiment, the rod lens main body 202 in this example is formed of BK7 having a refractive index of 1.5. The mirrors 210 are disposed near the rod lens main body 202. Each mirror 210 is plate-shaped and extends parallel to the axis O. The mirrors 210 are disposed one on either side of the rod lens main body 202 such that the rod lens main body 202 is positioned between the mirrors 210. Each mirror 210 includes a reflecting surface 211 that contacts the side surface 206 of the rod lens main body 202.

The rod lens 201 is disposed such that the axis O of the rod lens main body 202 perpendicularly intersects a light axis L of the laser light source 220 and collimating lens 230. In this example, both the light axis L and the axis O run horizontally. In other words, a plane orthogonal to the surface of the drawing that includes both the light axis L and axis O is level or horizontal. The two mirrors 210 are disposed above and below this level plane and are symmetrical with regard to the horizontal plane including the light axis L. The two mirrors 210 are sloped the same predetermined angle α, symmetrically with regard to the horizontal plane including the light axis L and the axis O, and face the collimating lens 230 at a slant.

Hereafter, the mirror 210 above the light axis L will be referred to as a mirror 210a, and the mirror 210 below the light axis L as a mirror 210b. The mirror 210a is sloped upward to the right to confront the collimating lens 230 at a slant. Similarly, the mirror 210b is sloped downward to the right to confront the collimating lens 230 at a slant. The slope angle α of the mirror 210a is formed by the reflecting surface 211 of the mirror 210a and the light axis L and is defined as a positive angle when the mirror 210a slopes upward to the right. The slope angle α of the mirror 210b is also formed by the reflecting surface 211 of the mirror 210b and the light axis L, and is defined as a positive angle when the mirror 210b slopes downward to the right. In the present embodiment, the slope angles α of the mirror 210a and mirror 210b are equivalent and within a range between 0° and 30°.

When a laser beam emitted from the laser light source 220 passes through the collimating lens 230, the collimating lens 230 converts the laser beam to collimated light having a predetermined beam diameter. The center portion of the collimated light near the light axis L on the plane of the drawing (a vertical cross section including the light axis L and perpendicular to the axis O) is directly incident on the side surface 206, is refracted, and passes through the rod lens main body 202. However, portions of the collimated light farther outward from the light axis L in the plane of the drawing is incident on the side surface 206 after being reflected by the mirrors 210, is refracted, and passes through the rod lens main body 202.

Figure 16:
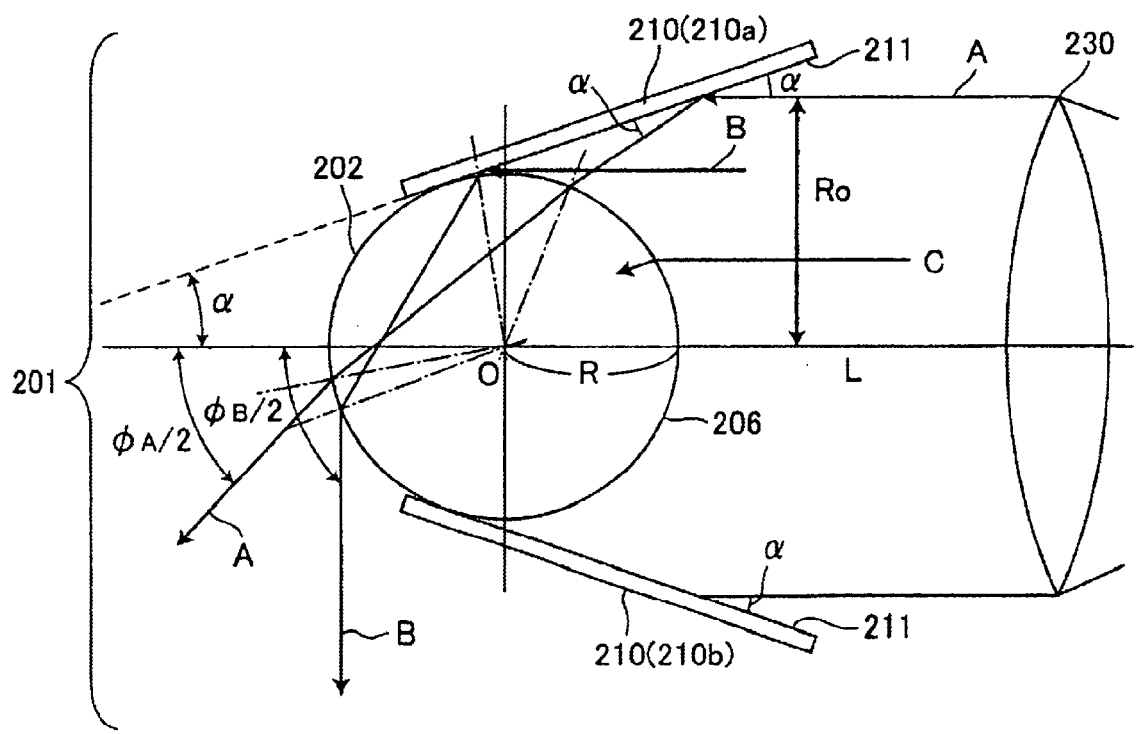
FIG. 16 is an explanatory diagram showing a rod lens according to the third embodiment of the present invention.

The rod lens 201 having this construction can efficiently convert into line beams not only incident light or a diameter less than or equal to the diameter of the rod lens main body 202, but also incident light having a diameter greater than that of the rod lens main body 202. This point will be described in more detail with reference to FIG. 16. FIG. 16 is a cross section of the rod lens 201 perpendicular to the axis O.

Assume that the diameter of the rod lens main body 202 is 2R, and that the diameter of the incident light in a cross section perpendicular to the light axis L is $2R_0$.

Here, a light A of incident light from the collimating lens 230 is at the farthest position from the light axis L. The distance between the optical path of the light A and the light axis L is exactly $R_0$. When the light A is reflected by the mirror 210, the angle formed by the optical path of the light A and the mirror 210 at the point of incidence is α and, therefore, the reflected angle is also α. Subsequently, the light A is incident on the rod lens main body 202 and is refracted according to Snell's law before being emitted from the rod lens main body 202. The outputted light forms an angle of φA/2 with the light axis L.

Light B is closer to the light axis L than the light A. The distance between the optical path of the light B and the light axis L is slightly greater than the radius R of the rod lens main body 202. Since the angle formed by the light B and the mirror 210 is α, the reflected angle of the light B is also α. Subsequently, the light B is incident on the rod lens main body 202 and refracted according to Snell's law before being emitted from the rod lens main body 202. The outputted light forms an angle φB/2 with the light axis L.

As can be seen from the drawing, φA/2<φB/2. In other words, the angle φB of the light B traveling along an optical path near the rod lens main body 202 is larger than the angle φA of the light A traveling along an optical path further from the rod lens main body 202, because the incidence angle of the light B on the rod lens main body 202 is larger than that of the light A on the rod lens main body 202.

However, a light C traveling along an optical path nearer to the light axis L than the light B is directly incident on the rod lens main body 202, refracted, and outputted.

The light intensity of the light B is greater than that of the light A because the light B is positioned closer to the light axis L than the light A. Since the light B, having a greater light intensity, produces a wider angle (φB/2), the light intensity at the ends of the line beam can be increased.

With the rod lens 201, outer light in the incident beam (such as the light A and B) is incident on the rod lens main body 202 after being reflected by the mirrors 210, while inner light (such as the light C) is directly incident on the rod lens main body 202, and both the inner and outer light can be converted together into a line beam. Accordingly, an incident beam having a diameter larger than the diameter of the rod lens main body 202 can be converted into a line beam.

In the present embodiment, the angle α is greater than 0° and less than or equal to 30°, the relationship $$\frac{1}{\sqrt{n^2-1}} \le \left| \frac{\sin 2\alpha \cos \alpha + \sin \alpha \cos 2\alpha}{\sin 2\alpha (\sin 2\alpha + \sin \alpha) - \cos 2\alpha (\cos \alpha - \cos 2\alpha)} \right|$$

is satisfied for the refractive index n of the rod lens main body 202, and moreover a beam-lens diameter ratio, which is defined as an incident beam diameter $2R_0$/a rod lens diameter $2R$, is set less than or equal to $$N = \frac{\tan 2\alpha(\tan\alpha\sin\alpha + \cos\alpha) + \tan\alpha(\tan 2\alpha\sin 2\alpha + \cos 2\alpha)}{\tan 2\alpha - \tan\alpha}$$

(more specifically, approximately 3). Accordingly, the rod lens 201 can convert nearly all the incident light into a line beam, thereby achieving a conversion efficiency of approximately 100%.

The inventor of the present invention performed a beam path tracking simulation in order to calculate the angle covered by a line beam produced by the rod lens 201. The rod lens main body 202 was formed of BK7, an ordinary glass material. The angle $\alpha$ was set to 10°, while the diameter of the incident beam was set to 1.5 times the diameter of the rod lens main body 202. Hence, $R_0 = 1.5R$. According to the results of the simulation, the light A traveling along a path equivalent to 1.5 times the diameter of the rod lens main body 202 was incident on the rod lens main body 202 at an angle of 30° to the normal, and the resulting angle $\phi A$ was 82°. The light B traveling along a path equivalent to 1.001 times the diameter of the rod lens main body 202 was incident on the lens at an angle of 78° to the normal, resulting in an angle $\phi B$ of 188°.

Next, the angle $\alpha$ of the mirror 210 and the beam-lens diameter ratio will be described in more detail with reference to FIGS. 17 and 18.

When setting the angle $\alpha$ at which the mirrors 210a and 210b are oriented and the beam-lens diameter ratio, it is necessary that the light beam reflected by the mirror 210a (or mirror 210b) and passing through the rod lens main body 202 should not be blocked by the other mirror 210b (or mirror 210a).

First, the reason that the angle $\alpha$ of the mirror 210a and mirror 210b should be greater than 0° and less than or equal to 30° will be described with reference to FIG. 17.

Figure 17:
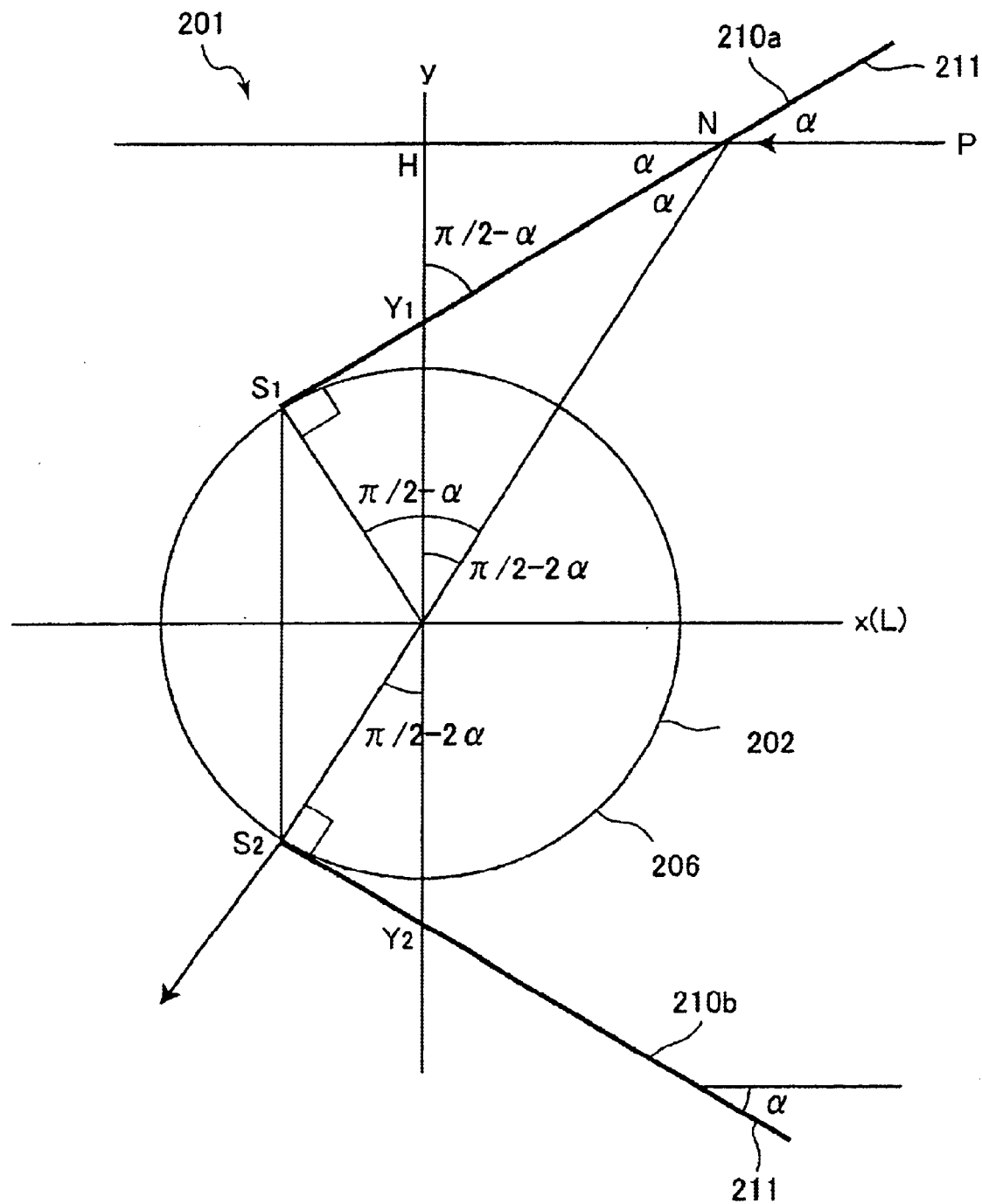
FIG. 17 is an explanatory diagram showing a desired angle for positioning mirrors.

As shown in FIG. 17, the x-axis is equivalent to the light axis L, and the y-axis extends perpendicularly to the axis O of the rod lens main body 202 and the x-axis (L). The points at which the mirror 210a and mirror 210b contact the rod lens main body 202 (end portions) will be called $S_1$ and $S_2$, and the points at which the mirror 210a and mirror 210b intersect the y-axis will be called $Y_1$ and $Y_2$. A line NO connecting a point N on the mirror 210a to the axis O forms a slope angle $\alpha$ with the mirror 210a.

Here, the angle $\alpha$ must be greater than 0°. If the angle $\alpha$ is smaller than 0°, then the mirror 210a will slope downward to the right and the mirror 210b will slope upward to the right, thereby blocking light from being incident on the rod lens main body 202. Further, if the angle $\alpha$ is equivalent to 0°, then the reflecting surface 211 on the mirror 210a and mirror 210b will be parallel to the light axis L and unable to reflect incident light.

In FIG. 17, a light P is incident on the mirror 210a at the point N and travels along the optical path equivalent to the line NO. Hence, the light P travels straight through the rod lens main body 202 without being refracted and is outputted on the other side. Here, if the angle $\alpha$ were greater than 30°, then an extension of the line NO would intersect the mirror 210b at a position right of the end $S_2$. In this case the light P would be blocked by the mirror 210b and not outputted.

For this reason, the angle $\alpha$ should be set less than or equal to 30°. When $\alpha = 30°$, an extension of the line NO intersects the end $S_2$, hence, the light P incident on the mirror 210a at the point N travels directly through the rod lens main body 202 along the line NO and is outputted at the end $S_2$ of the mirror 210b. In FIG. 17, the mirror 210a and mirror 210b are symmetrical with regard to the x-axis. Accordingly, the relationship $\triangle OS_1Y_1 = \triangle OS_2Y_2$ is obtained and therefore $\angle S_1OY_1 = \angle S_2OY_2$. Hence, in the triangle $OS_1Y_1$, $\angle S_1OY = (\pi/2 - \alpha) - (\pi/2 - 2\alpha) = \alpha$. In the triangle $OS_2Y_2$, $\angle S_2OY_2 = \pi/2 - 2\alpha$. From these, $\alpha = \pi/2 - 2\alpha$. By solving this, $\alpha = \pi/6$ (radians) = 30°.

Accordingly, the rod lens 201 can efficiently form line beams when the angle $\alpha$ of the mirror 210a and mirror 210b is greater than 0° and less than or equal to 30° with regard to the light axis L of the rod lens main body 202.

Next, the reason it is desirable for a to satisfy not only the condition $0° < \alpha \leq 30°$, but also the condition $$\frac{1}{\sqrt{n^2 - 1}} \leq \left|\frac{\sin 2\alpha\cos\alpha + \sin\alpha\cos 2\alpha}{\sin 2\alpha(\sin 2\alpha + \sin\alpha) - \cos 2\alpha(\cos\alpha - \cos 2\alpha)}\right|$$

for the refractive index n of the rod lens main body 202 will be described with reference to FIG. 18.

Figure 18:
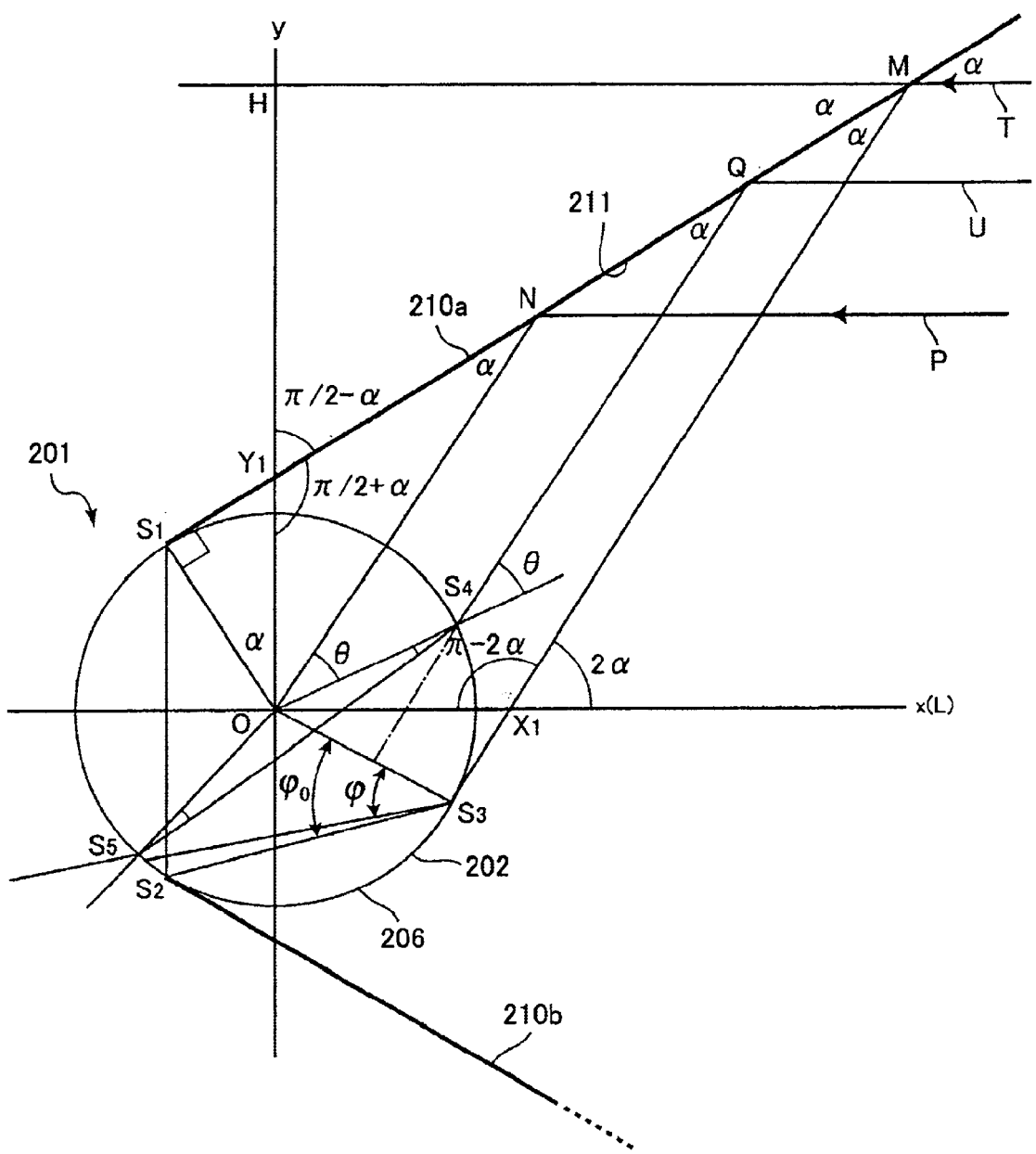
FIG. 18 is an explanatory diagram showing the desired angle for positioning the mirrors and a desired diameter of the incident beam.

In FIG. 18, the x-axis is equivalent to the light axis L, and the y-axis extends perpendicularly to the axis O of the rod lens main body 202 and the x-axis (L). The mirror 210a and mirror 210b are positioned at an angle $\alpha$ ($0° < \alpha \leq 30°$) in relation to the x-axis and contact the rod lens main body 202 at ends $S_1$ and $S_2$, respectively. R is the radius of the rod lens main body 202. A tangent $MS_3$ passing through a point $S_3$ on the rod lens main body 202 forms a slope angle $\alpha$ with the mirror 210a at a point M on the mirror 210a.

As shown in FIG. 18, a light T incident on the mirror 210a at the point M travels along an optical path equivalent to the tangent $MS_3$ and is incident on and refracted by the rod lens main body 202 at the point $S_3$. Here, if the slope angle $\alpha$ is $$\frac{1}{\sqrt{n^2 - 1}} > \left|\frac{\sin 2\alpha\cos\alpha + \sin\alpha\cos 2\alpha}{\sin 2\alpha(\sin 2\alpha + \sin\alpha) - \cos 2\alpha(\cos\alpha - \cos 2\alpha)}\right|$$

for the refractive index n of the rod lens main body 202, then the light T travels through the rod lens main body 202 along a path below the line $S_3S_2$ connecting points $S_3$ and $S_2$ in the drawing and intersects the mirror 210b. Accordingly, the light T is blocked by the mirror 210b.

However, when $$\frac{1}{\sqrt{n^2 - 1}} = \left|\frac{\sin 2\alpha\cos\alpha + \sin\alpha\cos 2\alpha}{\sin 2\alpha(\sin 2\alpha + \sin\alpha) - \cos 2\alpha(\cos\alpha - \cos 2\alpha)}\right|,$$

the optical path of the light T in the rod lens main body 202 is equivalent to the line $S_3S_2$. Hence, the light T can be outputted at the end $S_2$ of the mirror 210b. Further, if $$\frac{1}{\sqrt{n^2 - 1}} < \left|\frac{\sin 2\alpha\cos\alpha + \sin\alpha\cos 2\alpha}{\sin 2\alpha(\sin 2\alpha + \sin\alpha) - \cos 2\alpha(\cos\alpha - \cos 2\alpha)}\right|,$$

then the light T travels through the rod lens main body 202 along a path above the line $S_3S_2$ in the drawing and can be outputted without being blocked by the mirror 210b.

Next, the reason that the light T is blocked by the mirror 210b when $$\frac{1}{\sqrt{n^2 - 1}} \leq \left|\frac{\sin 2\alpha\cos\alpha + \sin\alpha\cos 2\alpha}{\sin 2\alpha(\sin 2\alpha + \sin\alpha) - \cos 2\alpha(\cos\alpha - \cos 2\alpha)}\right|$$

will be described in more detail.

Here, the coordinates of the point $S_2$ are $S_2(-R\sin\alpha, -R\cos\alpha)$

The equations for lines $OS_3$ and $S_2S_3$ are represented by equations (211) and (212) below, respectively.

$$y = -\frac{\cos 2\alpha}{\sin 2\alpha} \cdot x \qquad (211)$$

$$y = -\frac{\cos 2\alpha - \cos\alpha}{\sin 2\alpha + \sin\alpha} \cdot x - \frac{\sin\alpha(4\cos^2\alpha - 1)R}{\sin 2\alpha + \sin\alpha} \qquad (212)$$

In general, the following equation (213) is known, where $\theta$ is an acute angle formed by two lines $y=m_1x+n_1$ and $y=m_2x+n_2$.

$$\tan\theta = \left|\frac{m_1 - m_2}{1 + m_1 m_2}\right| \qquad (213)$$

From equations (211), (212) and (213), the following equation (214) is obtained, where $\phi_0$ is an angle formed by the line $OS_3$ and the line $S_2S_3$.

$$\tan\varphi_0 = \left|\frac{\frac{\cos\alpha - \cos 2\alpha}{\sin 2\alpha + \sin\alpha} + \frac{\cos 2\alpha}{\sin 2\alpha}}{1 + \left(\frac{\cos\alpha - \cos 2\alpha}{\sin 2\alpha + \sin\alpha}\right)\left(-\frac{\cos 2\alpha}{\sin 2\alpha}\right)}\right| \qquad (214)$$

An angle $\phi$ is the angle formed by the line $OS_3$ and the light T traveling through the rod lens main body 202 after being incident at the point $S_3$. Hence, inequality (215) needs to be satisfied to prevent the light T from being blocked by the mirror 210b.

$$\phi \leq \phi_0 \text{ therefore } \tan\phi \leq \tan\phi_0 \qquad (215)$$

$$\left(\because 0 < \varphi < \frac{\pi}{2}, 0 < \varphi_0 < \frac{\pi}{2}\right)$$

From equation (214) and inequality (215), inequality (216) is obtained.

$$\tan\varphi \leq \left|\frac{\frac{\cos\alpha - \cos 2\alpha}{\sin 2\alpha + \sin\alpha} + \frac{\cos 2\alpha}{\sin 2\alpha}}{1 + \left(\frac{\cos\alpha - \cos 2\alpha}{\sin 2\alpha + \sin\alpha}\right)\left(-\frac{\cos 2\alpha}{\sin 2\alpha}\right)}\right| \qquad (216)$$

Then, according to Snell's law, $$n \cdot \sin\phi = \sin\theta$$

$$\sin\varphi = \frac{1}{n}\sin\theta, \cos\varphi = \sqrt{1-\sin^2\varphi} = \frac{1}{n}\sqrt{n^2 - \sin^2\theta} \qquad (217)$$

Hence, $$\tan\varphi = \frac{\sin\varphi}{\cos\varphi} = \frac{\sin\theta}{\sqrt{n^2 - \sin^2\theta}} = \frac{1}{\sqrt{n^2-1}} \left(\because \theta = \frac{\pi}{2}\right) \qquad (218)$$

By rearranging inequality (216), the following inequality (219) is obtained.

$$\frac{1}{\sqrt{n^2-1}} \leq \left|\frac{\sin 2\alpha\cos\alpha + \sin\alpha\cos 2\alpha}{\sin 2\alpha(\sin 2\alpha + \sin\alpha) - \cos 2\alpha(\cos\alpha - \cos 2\alpha)}\right| \qquad (219)$$

Accordingly, the slope angle $\alpha$ of the mirror 210 should satisfy inequality (219) for the refractive index n of the rod lens main body 202.

When inequality (219) is satisfied, the light T and all incident light closer to the light axis L than the light T is reliably incident on the rod lens main body 202 and outputted without being blocked by the mirror 210b. For example, a light U closer to the light axis L than the light T is incident on the rod lens main body 202 at a point $S_4$ and outputted at a point $S_5$. Since the point $S_5$ is positioned above and left of the point $S_2$ in the drawing, the light U is not blocked by the mirror 210b.

Next, the reason that the beam-lens diameter ratio (=incident beam diameter $2R_0$/rod lens diameter $2R$) should be greater than 0 and less than or equal to $$N = \frac{\tan 2\alpha(\tan\alpha\sin\alpha + \cos\alpha) + \tan\alpha(\tan 2\alpha\sin 2\alpha + \cos 2\alpha)}{\tan 2\alpha - \tan\alpha}$$

will be described with reference to FIG. 18.

The line $S_1M$ indicating the mirror 210a is represented by the equation (221).

$$y = \tan\alpha \cdot x + R(\tan\alpha \cdot \sin\alpha + \cos\alpha) \qquad (221)$$

The optical path $MS_3$ of the light T reflected at the point M is represented by the following equation (222).

$$y = \tan 2\alpha \cdot x - R(\tan 2\alpha \cdot \sin 2\alpha + \cos 2\alpha) \qquad (222)$$

The y-coordinate for the intersecting point M of the two lines represented by the above equations (221) and (222) is represented by the following equation (223) derived from the two equations.

$$y = \frac{\tan 2\alpha(\tan\alpha\sin\alpha + \cos\alpha) + \tan\alpha(\tan 2\alpha\sin 2\alpha + \cos 2\alpha)}{\tan 2\alpha - \tan\alpha} \cdot R \qquad (223)$$

When the radius $R_0$ of the incident light is equivalent to the value y in the equation (223), then all of the light is incident on the rod lens main body 202 because the outermost light T of the incident light is incident on the rod lens main body 202 by just grazing the point $S_3$ on the rod lens main body 202. When the radius $R_0$ of incident light is less than or equal to the y in equation (223), then all light is incident on the rod lens main body 202. However, when the radius $R_0$ of the incident light is greater than the y in equation (223), then the outermost light is not incident on the rod lens main body 202 after being reflected by the mirror 210a. Accordingly, the value of y satisfying equation (223) should be the maximum value of the radius $R_0$ of incident light.

The maximum value N of the beam-lens diameter ratio is obtained by dividing both sides of equation (223) by the radius R, as shown in equation (224).

$$N = \frac{\tan 2\alpha(\tan\alpha\sin\alpha + \cos\alpha) - \tan\alpha(\tan 2\alpha\sin 2\alpha + \cos 2\alpha)}{\tan 2\alpha - \tan\alpha} \qquad (224)$$

Figures 19, 20:
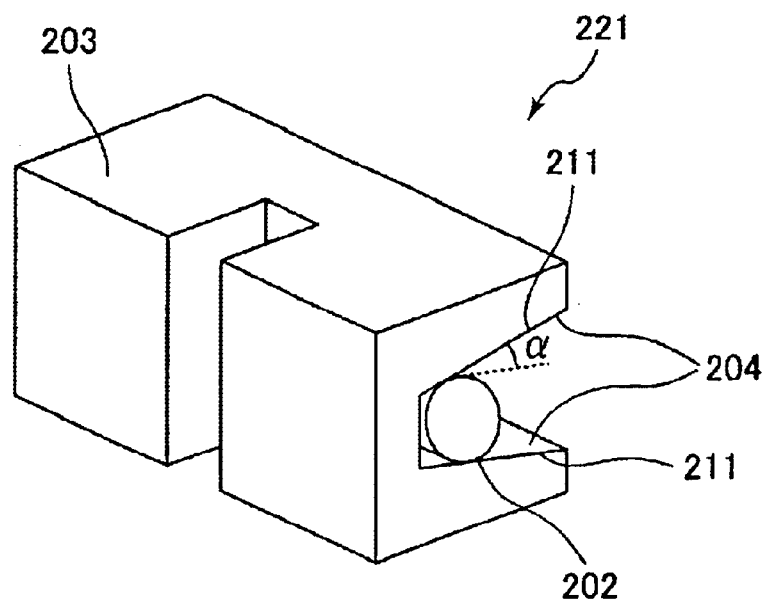
FIG. 19 is a table showing the relationship between mirror angles ($\alpha$) and maximum values N for the ratios of incident light diameters to rod lens diameters.
FIG. 20 is a perspective view showing a rod lens according to a modification of the third embodiment.

FIG. 19 shows the relationship between the angle $\alpha$ ($0° < \alpha \leq 30°$) of the mirrors 210a and 210b and the maximum value N of the beam-lens diameter ratio, which is determined by equation (224). The upper row in the table of FIG. 19 indicates the angle $\alpha$ of the mirrors 210a and 210b, while the lower row indicates the corresponding maximum value N of the beam-lens diameter ratio. From the table, it is desirable that the diameter of the laser beam incident on the rod lens 201 should be greater than 0 and less than or equal to three times the diameter of the rod lens main body 202. If the diameter of the incident beam is less than or equal to approximately three times the diameter of the rod lens, the incident light can be effectively utilized. However, if the diameter of the incident beam is greater than approximately three times the diameter of the rod lens, then a portion of the light will not strike the rod lens main body 202 and will be wasted.

From the above description, the light can be used at an efficiency of approximately 100% when the slope angle α is greater than 0° and less than or equal to 30°, the slope angle α satisfies the inequality (219), and the radius $R_0$ of the incident light is less than or equal to the value of y in equation (223), or more specifically, is less than or equal to approximately three times the radius R of the rod lens main body 202. This is because approximately all of the incident light strikes the rod lens main body 202 and is converted into a line beam and the line beam can be outputted without being blocked by the mirrors 210. More specifically, by setting the radius $R_0$ of the incident light to a value greater than the radius R of the rod lens main body 202 and less than or equal to about three times the radius R, a line beam having a very large spreading angle can be produced.

FIG. 20 is a modification of the rod lens 201 according to the present embodiment. A rod lens 221 according to the modification includes the rod lens main body 202 and a rod lens holding member 203. The rod lens holding member 203 has a pair of tapered portions 204. The tapered portions 204 slope at a predetermined angle α (greater than 0° and less than or equal to 30°). The rod lens main body 202 is held between the tapered portions 204. The reflecting surfaces 211 contact the side surface 206 of the rod lens main body 202. The reflecting surfaces 211 having mirror finishes are formed on the inner walls of each tapered portion 204 by a method of plating, a method of forming film through vacuum deposition, or the like. Accordingly, the rod lens holding member 203 functions both for holding the rod lens main body 202 and for reflecting and guiding incident light onto the rod lens main body 202. Hence, the rod lens holding member 203 can achieve both a lens holding effect and a beam angle spreading effect.

Figure 21:
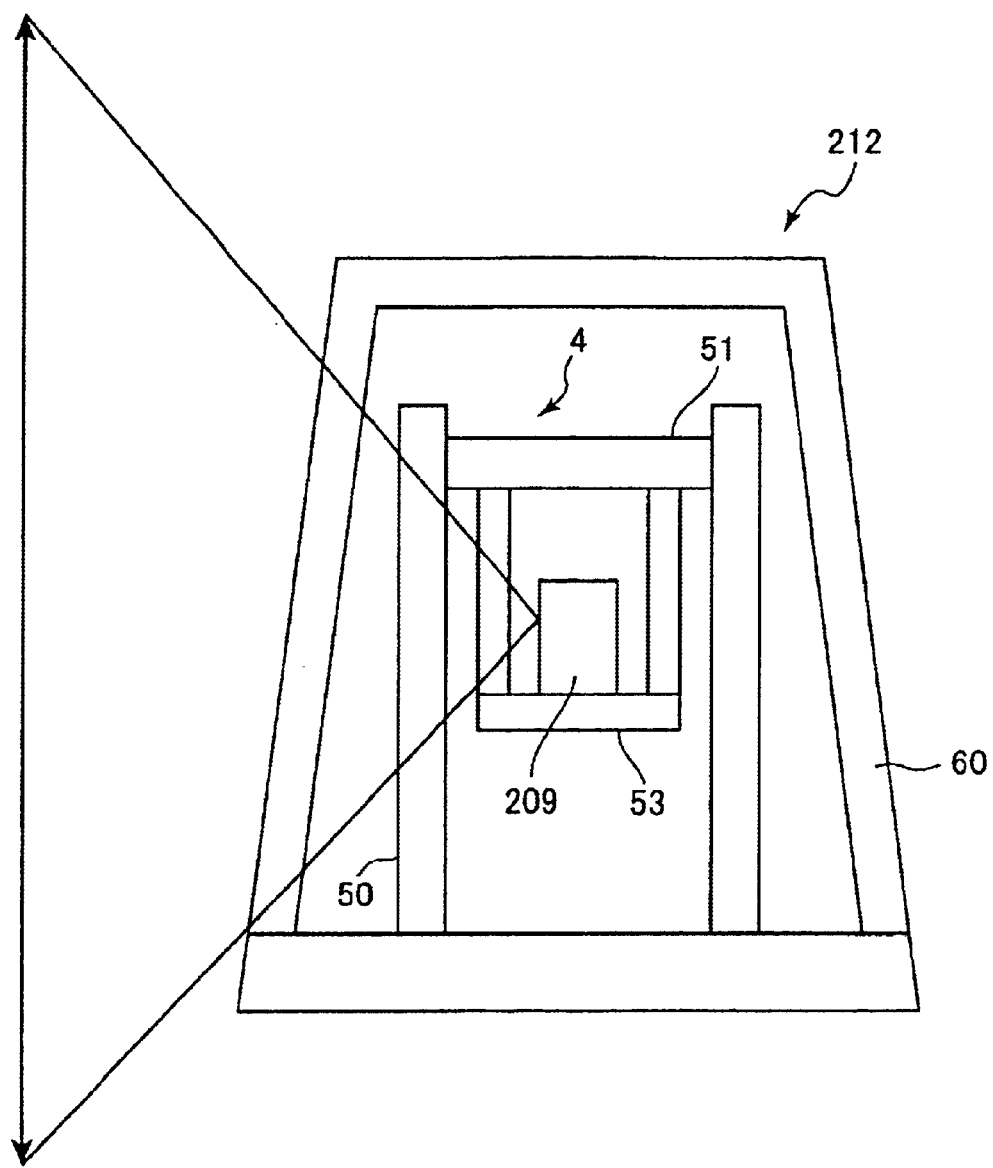
FIG. 21 is an explanatory diagram showing a laser marking apparatus according to the third embodiment of the present invention and a line beam generated from the laser marking apparatus.

FIG. 21 shows a laser marking apparatus 212 according to the present embodiment. The laser marking apparatus 212 according to the present embodiment is configured by providing the line-beam generating optical system 209 (FIG. 15) in the laser marking apparatus 10 of the first embodiment (FIG. 7) in place of the line-beam generating optical system 9. The laser marking apparatus 212 can form a vertical line beam, In the rod lens 201 according to the present embodiment, the diameter of the laser beam incident on the rod lens main body 202 is set greater than the cross-sectional diameter of the rod lens main body 202, and the mirrors 210 are disposed near the rod lens main body 202 to reflect incident light onto the rod lens main body 202. Therefore, the laser marking apparatus 212 can convert 100% of the incident light to a line beam, making extremely effective use of the laser beam. Further, light with a stronger beam intensity incident on the rod lens main body 202 after being reflected by the mirror 210 has a wider angle than the light having weaker beam intensity. Thus, the laser marking apparatus 212 increases the beam intensity on the ends of the line beam. As a result, it is possible to expand the spreading angle of visible light in the line beam. Accordingly, the laser marking apparatus 212 can produce a line beam having a relatively uniform intensity and generate a line beam covering a very large spreading angle that can be easily seen. For example, the laser marking apparatus 212 can produce a line beam having an effective visible spreading angle of approximately 190°.

In the embodiment described above, the line-beam generating optical system 209 forms a vertical line beam by disposing the laser light source 220, collimating lens 230, and rod lens 201 horizontally. However, by arranging the laser light source 220, collimating lens 230, and rod lens 201 vertically, the line-beam generating optical system 209 can form a horizontal line beam.

While the rod lens, line-beam generating optical system, and laser marking apparatus have been described in detail with reference to specific embodiments thereof, it would be apparent to those skilled in the art that various changes and modifications may be made therein without departing from the spirit of the invention.

For example, the line-beam generating optical system 9 of the first embodiment described with reference to FIG. 8 can be constructed without the first half mirror 7 and second half mirror 8. A line beam can also be formed using at least one of the rod lens 1a, rod lens 1b, and rod lens 1c. Similarly, the line-beam generating optical system 109 according to the second embodiment described with reference to FIG. 13 can be constructed without the first half mirror 7 and the second half mirror 8 and a line beam can be formed using at least one of the rod lenses 101a, 101b, and 101c.

The rod lens 201 according to the third embodiment can be used in place of the rod lens 1 according to the first embodiment for use as the rod lenses 1a, 1b, and 1c in the line-beam generating optical system 9 according to the first embodiment.

The rod lens 201 according to the third embodiment may also be provided with only a single mirror 210. When low conversion efficiency is not a problem, the slope angle of the mirror 210 need not satisfy inequality (219). Further, the beam-lens diameter ratio can be greater than the maximum value N that satisfies equation (224). If an even lower conversion efficiency is not a problem, then the slope angle α of the mirrors 210 need not be greater than 0° and less than or equal to 30°, but may be less than or equal to 0° or greater than or equal to 30°. Similarly, in the modification shown in the FIG. 20, the slope angle α of the reflecting surfaces 211 formed on the inner walls of each tapered portion 204 may be less than or equal to 0° or greater than or equal to 30°.

What is claimed is:

1. A rod lens comprising:

a reflecting portion generating a reflected light by reflecting at least a portion of an incident light; and a rod lens main body of substantially a cylindrical shape generating a transmitted light by transmitting at least a remaining portion of the incident light, the rod lens main body having an axis and a circumferential side surface extending along the axis, the circumferential side surface being substantially cylindrical in shape and encircling the axis in a circumferential direction, the reflecting portion and the rod lens main body cooperating to generate a line beam made from both of the reflected light and the transmitted light.

2. A rod lens according to claim 1, wherein the reflecting portion includes a light separating portion, which is formed on at least a part of the circumferential side surface of the rod lens main body along the circumferential direction and which separates the incident light into both of the transmitted light and the reflected light.

3. A rod lens according to claim 2, wherein the light separating portion is formed in an area of the circumferential side surface defined around the axis with an angle of $2\phi$ max (radians) that satisfies the following two inequalities:

$$4\phi\max - 2\sin^{-1}\left(\frac{\sin\phi\max}{n}\right) - \pi \geq 0$$

$2\phi \max \leq \pi$,
wherein the rod lens main body has a refractive index n and a ratio of a circumference of a circle to the diameter of the circle is π.

4. A rod lens according to claim 3, wherein the refractive index of the rod lens main body is 1.5, and wherein the light separating portion is formed on the circumferential side surface to spread around the axis with an angle whose amount has a value greater than or equal to approximately 35.17% of the entire angle 2 π for the entire circumferential side surface in the circumferential direction and smaller than or equal to approximately 50% of is the entire angle 2 π for the entire circumferential side surface in the circumferential direction.

5. A rod lens according to claim 2, wherein the light separating portion includes a light separating film formed over the at least a part of the circumferential side surface.

6. A rod lens according to claim 1, wherein the reflecting portion includes a light reflecting region which is formed over a part of the circumferential side surface along the circumferential direction and which receives and reflects a portion of the incident light,
wherein the rod lens main body includes a transmitting region which receives and transmits the remaining portion of the incident light.

7. A rod lens according to claim 6, wherein the light reflecting region includes: a first reflecting region and a second reflecting region which are formed or the circumferential side surface at two regions separated from each other in the circumferential direction, and
wherein the transmitting region is defined as an area between the first and second reflecting regions on the circumferential side surface in the circumferential direction.

8. A rod lens according to claim 7, wherein each of the first and second reflecting regions has a centerline extending parallel to the axis, the centerlines being separated from each other by an angle of approximately 120° about the axis.

9. A rod lens according to claim 8, wherein each of the first and second reflecting regions is formed on the circumferential side surface of the rod lens main body as being centered about the corresponding centerline and as covering an angle of approximately 60° about the axis.

10. A rod lens according to claim 1, wherein the reflecting portion includes a reflecting member which is disposed near the rod lens main body and which generates a reflected light by receiving and reflecting a portion of the incident light in a direction toward the rod lens main body, and
wherein the rod lens main body generates a line beam by transmitting both of the remaining portion of the incident light and the reflected light.

11. A rod lens according to claim 10, wherein the reflecting member includes at least two reflecting members,
wherein the axis of the rod lens main body extends substantially perpendicularly to an optical axis of the incident light, and
wherein each reflecting member extends along the axis of the rod lens main body and forms a predetermined angle with respect to the optical axis of the incident light, thereby reflecting the light incident to the reflecting member toward the rod lens main body.

12. A rod lens according to claim 11, wherein each reflecting member has a reflecting surface that contacts the circumferential side surface of the rod lens main body.

13. A rod lens according to claim 11, wherein the predetermined angle is greater than approximately 0° and less than or equal to approximately 30°.

14. A rod lens according to claim 11, wherein the predetermined angle has a value α that satisfies the following inequality:

$$\frac{1}{\sqrt{n^2-1}} \leq \left|\frac{\sin2\alpha\cos\alpha + \sin\alpha\cos2\alpha}{\sin2\alpha(\sin2\alpha+\sin\alpha) - \cos2\alpha(\cos\alpha-\cos2\alpha)}\right|,$$

wherein the rod lens main body has a refractive index n.

15. A rod lens according to claim 1, wherein the reflecting portion includes a support member that holds the rod lens main body and that has at least two reflecting surfaces,
wherein the axis of the rod lens main body extends approximately perpendicularly to an optical axis of the incident light, and
wherein each reflecting surface extends along the axis of the rod lens main body, contacts the circumferential side surface of the rod lens main body, and forms a predetermined angle with respect to the optical axis of the incident light.

16. A line-beam generating optical system, comprising:
a light source emitting a light beam along an optical axis;
a collimating lens converting the light beam emitted from the light source into a collimated light; and
a rod lens including:
a reflecting portion generating a reflected light by reflecting at least a portion of the collimated light that falls incident on the rod lens along the optical axis; and
a rod lens main body of substantially a cylindrical shape generating a transmitted light by transmitting at least a remaining portion of the incident collimated light, the rod lens main body having an axis that extends substantially perpendicularly to the optical axis and a circumferential side surface extending along the axis, the circumferential side surface being substantially cylindrical in shape and encircling the axis in a circumferential direction, the reflecting portion and the rod lens main body cooperating to generate a line beam made from both of the reflected light and the transmitted light.

17. A line-beam generating optical system according to claim 16, wherein the reflecting portion includes a light separating portion, which is formed on at least a part of the circumferential side surface of the rod lens main body along the circumferential direction and which separates the incident light into both of the transmitted light and the reflected light.

18. A line-beam generating optical system according to claim 17, wherein the light separating portion is formed in an area of the circumferential side surface defined around the axis with an angle of 2 φ max (radians) that satisfies the following two inequalities:

$$4\phi\max - 2\sin^{-1}\left(\frac{\sin\phi\max}{n}\right) - \pi \geq 0,$$

$2\phi \max \leq \pi$,
wherein the rod lens main body has a refractive index n and a ratio of a circumference of a circle to the diameter of the circle is π.

19. A line-beam generating optical system according to claim 18, wherein the refractive index of the rod lens main body is 1.5, and wherein the light separating portion is formed on the circumferential side surface at its side, on which the incident light falls incident, to spread around the axis with an angle whose amount has a value greater than or equal to approximately 35.17% of the entire angle $2\pi$ for the entire circumferential side surface in the circumferential direction and smaller than or equal to approximately 50% of the entire angle $2\pi$ for the entire circumferential side surface in the circumferential direction.

20. A line-beam generating optical system according to claim 18, further comprising a half mirror separating the collimated light into a reflected collimated light and a transmitted collimated light,
wherein the rod lens includes at least one of a rod lens disposed on an optical path of the reflected collimated light and another rod lens disposed on an optical path of the transmitted collimated light.

21. A line-beam generating optical system according to claim 17, further comprising a half mirror separating the collimated light into a first reflected collimated light and a first transmitted collimated light;
wherein the rod lens includes:
a first rod lens disposed on an optical path of the first reflected collimated light; and
a second rod lens disposed on an optical path of the first transmitted collimated light, thereby forming at least two line beams.

22. A line-beam generating optical system according to claim 21, wherein each of the first and second rod lenses has the light separating portion,
wherein the light separating portion of each rod lens is formed in an area of a circumferential side surface of the corresponding rod lens main body at its side, on which the corresponding collimated light falls incident, the area being defined around the axis with an angle of $2\phi$ max (radians) that satisfies the following two inequalities:

$$4\phi\max - 2\sin^{-1}\left(\frac{\sin\phi\max}{n}\right) - \pi \geq 0,$$

$2\phi$ max $\leq \pi$,
wherein the corresponding rod lens main body has a refractive index n and a ratio of a circumference of a circle to the diameter of the circle is $\pi$.

23. A line-beam generating optical system according to claim 21, wherein the half mirror transmits the first reflected collimated light, which has been reflected off the half mirror and which has been reflected by the first rod lens to return to the half mirror, thereby obtaining another transmitted collimated light by transmitting the first reflected collimated light through the half mirror.

24. A line-beam generating optical system according to claim 17, wherein the light separating portion includes a light separating film formed over the at least a part of the circumferential side surface in the circumferential direction.

25. A line-beam generating optical system according to claim 16, wherein the reflecting portion includes a light reflecting region which is formed over a part of the circumferential side surface along the circumferential direction and which receives and reflects a portion of the incident collimated light,
wherein the rod lens main body includes a transmitting region which receives and transmits the remaining portion of the incident light.

26. A line-beam generating optical system according to claim 25, wherein the light reflecting region includes: a first reflecting region and a second reflecting region which are formed on the circumferential side surface at its side, on which the collimated incident light falls incident, the first reflecting region and the second reflecting region being formed at two regions separated from each other in the circumferential direction, and
wherein the transmitting region is defined as an area between the first and second reflecting regions on the circumferential side surface in the circumferential direction.

27. A line-beam generating optical system according to claim 26, wherein each of the first and second reflecting regions has a centerline extending parallel to the axis, the centerlines being separated from each other by an angle of approximately 120° about the axis.

28. A line-beam generating optical system according to claim 27, wherein each of the first and second reflecting regions is formed on the circumferential side surface of the rod lens main body as being centered about the corresponding centerline and as covering an angle of approximately 60° about the axis.

29. A line-beam generating optical system according to claim 25, further comprising a half mirror separating the collimated light into a first reflected collimated light and a first transmitted collimated light;
wherein the rod lens includes:
a first rod lens disposed on an optical path of the first reflected collimated light; and
a second rod lens disposed on an optical path of the first transmitted collimated light, thereby forming at least two line beams.

30. A line-beam generating optical system according to claim 29, wherein the half mirror transmits the first reflected collimated light, which has been reflected off the half mirror and which has been reflected by the first rod lens to return to the half mirror, thereby obtaining another transmitted collimated light by transmitting the first reflected collimated light through the half mirror.

31. A line-beam generating optical system according to claim 25, further comprising a half mirror separating the collimated light into a reflected collimated light and a transmitted collimated light,
wherein the rod lens includes at least one of a rod lens disposed on an optical path of the reflected collimated light and another rod lens disposed on an optical path of the transmitted collimated light, thereby forming at least one line beam.

32. A line-beam generating optical system according to claim 16, wherein the reflecting portion includes a reflecting member which is disposed near the rod lens main body and which generates a reflected light by receiving and reflecting a portion of the incident collimated light in a direction toward the rod lens main body, and
wherein the rod lens main body generates a line beam by transmitting both of the remaining portion of the incident collimated light and the reflected light.

33. A line-beam generating optical system according to claim 32, wherein the reflecting member includes at least two reflecting members, and
wherein each reflecting member extends along the axis of the rod lens main body and forms a predetermined angle with respect to the optical axis of the incident collimated light, thereby reflecting the collimated light incident to the reflecting member toward the rod lens main body.

34. A line-beam generating optical system according to claim 32, wherein the reflecting member has a reflecting surface that contacts the circumferential side surface of the rod lens main body and forms a predetermined angle with the optical axis of the collimated light, thereby reflecting the received portion of the collimated light toward the rod lens main body, and the rod lens main body converts, into a line beam, both of the portion of the collimated light reflected by the reflecting member and the remaining portion of the collimated light that falls directly incident on the rod lens main body.

35. A line-beam generating optical system according to claim 34, wherein the predetermined angle is greater than approximately 0° and less than or equal to approximately 30°.

36. A line-beam generating optical system according to claim 32, wherein the collimating lens emits, toward the rod lens, the collimated light having a beam diameter in a cross section substantially perpendicular to the optical axis of the collimated light, the beam diameter being greater than the diameter of the rod lens main body.

37. A line-beam generating optical system according to claim 32, wherein the collimating lens emits, toward the rod lens, the collimated light having a beam diameter in a cross section substantially perpendicular to the optical axis of the collimated light, the beam diameter being greater than a value equal to zero times as large as the diameter of the rod lens main body and smaller than or equal to another value approximately equal to three times as large as the diameter of the rod lens main body.

38. A line-beam generating optical system according to claim 16, wherein the reflecting portion includes a support member that holds the rod lens main body and that has at least two reflecting surfaces, and wherein each reflecting surface extends along the axis of the rod lens main body, contacts the circumferential side surface of the rod lens main body, and forms a predetermined angle with respect to the optical axis of the incident collimated light.

39. A line-beam generating optical system according to claim 38, wherein the predetermined angle is greater than approximately 0° and less than or equal to approximately 30°.

40. A line-beam generating optical system, comprising:
a light source emitting a light beam;
a collimating lens converting the light beam emitted from the light source into a collimated light;
a first half mirror separating the collimated light into a first reflected collimated light and a first transmitted collimated light;
a first rod lens disposed on an optical path of the first reflected collimated light;
a second half mirror disposed on an optical path of the first transmitted collimated light and separating the first transmitted collimated light into a second reflected collimated light and a second transmitted collimated light;
a second rod lens disposed on an optical path of the second reflected collimated light; and
a third rod lens disposed on an optical path of the second transmitted collimated light;
wherein each of the first rod lens, second rod lens, and third rod lens includes a rod lens main body substantially cylindrical in shape with a circumferential side surface extending along a corresponding axis and generating a transmitted light by transmitting at least a portion of the corresponding collimated light, and wherein a light separating portion is formed on a portion of the circumferential side surface of at least one of the first, second, and third rod lenses, the light separating portion separating the corresponding collimated light into a transmitted light and a reflected light, thereby generating a line beam made from the transmitted light and the reflected light.

41. A line-beam generating optical system according to claim 40, wherein the light separating portion of each of the at least one of the first, second, and third rod lenses is formed in an area of a circumferential side surface of the corresponding rod lens main body at its side, on which the corresponding collimated light falls incident, the area being defined around the axis with an angle of 2 φ max (radians) that satisfies the following two inequalities:

$$4\phi\max - 2\sin^{-1}\left(\frac{\sin\phi\max}{n}\right) - \pi \geq 0,$$

2φ max ≦ π, wherein the corresponding rod lens main body has a refractive index n and a ratio of a circumference of a circle to the diameter of the circle is π.

42. A line-beam generating optical system according to claim 40, wherein the first half mirror transmits the first reflected collimated light, which has been reflected off the first half mirror and which has been reflected by the first rod lens to return to the first half mirror, thereby obtaining another transmitted collimated light by transmitting the first reflected collimated light through the first half mirror.

43. A line-beam generating optical system, comprising:
a light source emitting a light beam;
a collimating lens converting the light beam emitted from the light source into a collimated light;
a first half mirror separating the collimated light into a first reflected collimated light and a first transmitted collimated light;
a first rod lens disposed on an optical path of the first reflected collimated light;
a second half mirror disposed on an optical path of the first transmitted collimated light and separating the first transmitted collimated light into a second reflected collimated light and a second transmitted collimated light;
a second rod lens disposed on an optical path of the second reflected collimated light; and
a third rod lens disposed on an optical path of the second transmitted collimated light,
wherein each of the first rod lens, second rod lens, and third rod lens includes a rod lens main body substantially cylindrical in shape with a circumferential side surface extending along a corresponding axis and generating a transmitted light by transmitting at least a portion of the corresponding collimated light, and wherein a light reflecting region is formed over a part of the circumferential side surface of at least one of the first, second, and third rod lenses along the circumferential direction and receives and reflects a portion of the incident collimated light, the corresponding rod lens main body including a transmitting region which receives and transmits the remaining portion of the incident light.

44. A line-beam generating optical system according to claim 43, wherein the first half mirror transmits the first reflected collimated light, which has been reflected off the first half mirror and which has been reflected by the first rod lens to return to the first half mirror, thereby obtaining another transmitted collimated light by transmitting the first reflected collimated light through the first half mirror.

45. A laser marking apparatus comprising:
- a laser emitting a light beam along an optical axis;
- a collimating lens converting the light beam emitted from the laser into a collimated light;
- a rod lens including:
  - a reflecting portion generating a reflected light by reflecting at least a portion of the collimated light that falls incident on the rod lens along the optical axis; and
  - a rod lens main body of substantially a cylindrical shape generating a transmitted light by transmitting at least a remaining portion of the incident collimated light, the rod lens main body having an axis that extends substantially perpendicularly to the optical axis and a circumferential side surface extending along the axis, the circumferential side surface being substantially cylindrical in shape and encircling the axis in a circumferential direction, the reflecting portion and the rod lens main body cooperating to generate a line beam made from both of the reflected light and the transmitted light; and
- a support portion supporting the laser, the collimating lens, and the rod lens.

46. A laser marking apparatus according to claim 45, wherein the reflecting portion includes a light separating portion, which is formed on at least a part of the circumferential side surface of the rod lens main body along the circumferential direction and which separates the incident light into both of the transmitted light and the reflected light.

47. A laser marking apparatus according to claim 46, further comprising a half mirror separating the collimated light into a first reflected collimated light and a first transmitted collimated light;
wherein the rod lens includes:
  - a first rod lens disposed on an optical path of the first reflected collimated light; and
  - a second rod lens disposed on an optical path of the first transmitted collimated light,
wherein each of the first and second rod lenses has the light separating portion, and
wherein the light separating portion of each rod lens is formed in an area of the circumferential side surface of the corresponding rod lens main body at its side, on which the corresponding collimated light falls incident, the area being defined around the axis with an angle of 2 ϕ max (radians) that satisfies the following two inequalities:

$$4\phi\max - 2\sin^{-1}\left(\frac{\sin\phi\max}{n}\right) - \pi \geq 0,$$

2ϕ max≦π,
wherein the corresponding rod lens main body has a refractive index n and a ratio of a circumference of a circle to the diameter of the circle is π.

48. A laser marking apparatus according to claim 46, further comprising a half mirror separating the collimated light into a reflected collimated light and a transmitted collimated light;
wherein the rod lens includes at least one of a rod lens disposed on an optical path of the reflected collimated light and another rod lens disposed on an optical path of the transmitted collimated light,
wherein the light separating portion of each of the at least one rod lens is formed in an area of the circumferential side surface of the corresponding rod lens main body at its side, on which the corresponding collimated light falls incident, the area being defined around the axis with an angle of 2 ϕ max (radians) that satisfies the following two inequalities:

$$4\phi\max - 2\sin^{-1}\left(\frac{\sin\phi\max}{n}\right) - \pi \geq 0,$$

2ϕ max≦π,
wherein the rod lens main body has a refractive index n and a ratio of a circumference of a circle to the diameter of the circle is π.

49. A laser marking apparatus according to claim 46, wherein the light separating portion includes a light separating film formed over the at least a part of the circumferential side surface in the circumferential direction.

50. A laser marking apparatus according to claim 45, wherein the reflecting portion includes a light reflecting region which is formed over a part of the circumferential side surface along the circumferential direction and which receives and reflects a portion of the incident collimated light,
wherein the rod lens main body includes a transmitting region which receives and transmits the remaining portion of the incident light.

51. A laser marking apparatus according to claim 50, further comprising a half mirror separating the collimated light into a first reflected collimated light and a first transmitted collimated light;
wherein the rod lens includes:
  - a first rod lens disposed on an optical path of the first reflected collimated light; and
  - a second rod lens disposed on an optical path of the first transmitted collimated light, thereby forming at least two line beams.

52. A laser marking apparatus according to claim 50, further comprising a half mirror separating the collimated light into a reflected collimated light and a transmitted collimated light,
wherein the rod lens includes at least one of a rod lens disposed on an optical path of the reflected collimated light and another rod lens disposed on an optical path of the transmitted collimated light, thereby forming at least one line beam.

53. A laser marking apparatus according to claim 45, wherein the reflecting portion includes a reflecting member which is disposed near the rod lens main body and which generates a reflected light by reflecting and receiving a portion of the incident collimated light in a direction toward the rod lens main body, and
wherein the rod lens main body generates a line beam by transmitting both of the remaining portion of the incident collimated light and the reflected light.

54. A laser marking apparatus according to claim 53, wherein the reflecting member extends along the axis of the rod lens main body and forms a predetermined angle with respect to the optical axis of the incident collimated light, thereby reflecting the collimated light incident to the reflecting member toward the rod lens main body.

55. A laser marking apparatus according to claim 53, wherein the reflecting member has two reflecting surfaces, each of which contacts the circumferential side surface of the rod lens main body and forms a predetermined angle with the optical axis of the collimated light, thereby reflecting the received portion of the collimated light toward the rod lens main body, and wherein the rod lens main body converts, into a line beam, both of the portion of the collimated light reflected by the reflecting member and the remaining portion of the collimated light that falls directly incident on the rod lens main body.

56. A laser marking apparatus according to claim 55, wherein the predetermined angle is greater than approximately 0° and less than or equal to approximately 30°.

57. A laser marking apparatus according to claim 53, wherein the collimating lens emits, toward the rod lens, the collimated light having a beam diameter in a cross section substantially perpendicular to the optical axis of the collimated light, the beam diameter being greater than a value equal to zero times as large as the diameter of the rod lens main body and smaller than or equal to another value approximately equal to three times as large as the diameter of the rod lens main body.

58. A laser marking apparatus, comprising:

a laser emitting a light beam;

a collimating lens converting the light beam emitted from the laser into a collimated light;

a first half mirror separating the collimated light into a first reflected collimated light and a first transmitted collimated light;

a first rod lens disposed on an optical path of the first reflected collimated light;

a second half mirror disposed on an optical path of the first transmitted collimated light and separating the first transmitted collimated light into a second reflected collimated light and a second transmitted collimated light;

a second rod lens disposed on an optical path of the second reflected collimated light;

a third rod lens disposed on an optical path of the second transmitted collimated light; and a support portion supporting the laser, the collimating lens, the first and second half mirrors, and the first, second, and third rod lenses, wherein each of the first rod lens, second rod lens, and third rod lens includes a rod lens main body substantially cylindrical in shape with a circumferential side surface extending along a corresponding axis and generating a transmitted light by transmitting at least a portion of the corresponding collimated light, and wherein a light separating portion is formed on a portion of the circumferential side surface of at least one of the first, second, and third rod lenses, the light separating portion separating the corresponding collimated light into a transmitted light and a reflected light, thereby generating a line beam made from the transmitted light and the reflected light.

59. A laser marking apparatus, comprising:

a laser emitting a light beam;

a collimating lens converting the light beam emitted from the laser into a collimated light;

a first half mirror separating the collimated light into a first reflected collimated light and a first transmitted collimated light;

a first rod lens disposed on an optical path of the first reflected collimated light;

a second half mirror disposed on an optical path of the first transmitted collimated light and separating the first transmitted collimated light into a second reflected collimated light and a second transmitted collimated light;

a second rod lens disposed on an optical path of the second reflected collimated light;

a third rod lens disposed on an optical path of the second transmitted collimated light; and a support portion supporting the laser, the collimating lens, the first and second half mirrors, and the first, second, and third rod lenses, wherein each of the first rod lens, second rod lens, and third rod lens includes a rod lens main body substantially cylindrical in shape with a circumferential side surface extending along a corresponding axis and generating a transmitted light by transmitting at least a portion of the corresponding collimated light, and wherein a light reflecting region is formed over a part of the circumferential side surface of at least one of the first, second, and third rod lenses along the circumferential direction and receives and reflects a portion of the incident collimated light, the corresponding rod lens main body including a transmitting region which receives and transmits the remaining portion of the incident light.

* * * * *